United States Patent [19]

Chang

[11] Patent Number: 5,550,903
[45] Date of Patent: Aug. 27, 1996

[54] METHOD FOR MONITORING TELEPHONE COMPLETION DATA

[75] Inventor: Chuan-Chuen Chang, Holmdel, N.J.

[73] Assignee: Lucent Technologies Inc., Murray Hill, N.J.

[21] Appl. No.: 164,077

[22] Filed: Dec. 8, 1993

[51] Int. Cl.$^6$ ................................................ H04M 15/00
[52] U.S. Cl. .................................................... 379/115
[58] Field of Search .................................. 379/111, 112, 379/113, 114, 115, 133, 137, 138

[56] References Cited

U.S. PATENT DOCUMENTS

| | | | |
|---|---|---|---|
| 4,456,788 | 6/1984 | Kline et al. | 379/137 |
| 4,849,971 | 7/1989 | Karras et al. | 379/114 |
| 5,359,649 | 10/1994 | Rosu et al. | 379/113 |

*Primary Examiner*—Stephen Chin
*Assistant Examiner*—Kevin Kim

[57] ABSTRACT

A method for monitoring telephone completion data to forecast the economic benefit realized in increasing international telephone call completion. The method includes a model for evaluating carried calling loads realized from a domestic origination point to an international end destination. The method factors various network blocking loads, international telephone answer seizure ratios (ASR), and a calculated volume of ineffective call attempts in evaluating the economic benefit realized from increasing international telephone trunk capacity and/or rendering improvements for foreign internal telephone network ASR. The method also incorporates a model for evaluating calling loads over given calling hours for given calling days of giving calling months; a revenue and expense model for approximating the economic benefits realized from increasing telephone trunk capacity and/or improving foreign internal telephone network ASR; and a model for acknowledging the benefits realized from a proportional return of telephone call load from a foreign telecommunications administrator relative to the increase in telephone trunk capacity and/or improvements to foreign internal telephone network ASR.

32 Claims, 9 Drawing Sheets

FIG. 11

WORLD REGION:     COUNTRY CODE:     COUNTRY NAME:     TYPE OF DAY: ABD

| TOTAL DAY OFFERED LOAD: | JAN | FEB | MAR | APR | MAY | JUNE | JULY | AUG | SEPT | OCT | NOV | DEC |
|---|---|---|---|---|---|---|---|---|---|---|---|---|
|  | 268938 | 276062 | 290061 | 303601 | 314382 | 324828 | 340893 | 339445 | 326316 | 319858 | 334201 | 355032 |
| PEAK HOUR: | 8 | 22 | 8 | 22 | 9 | 22 | 22 | 22 | 22 | 9 | 8 | 8 |

PERCENT OF TOTAL LOAD FOR EACH HOUR

| HOUR | JAN | FEB | MAR | APR | MAY | JUNE | JULY | AUG | SEPT | OCT | NOV | DEC |
|---|---|---|---|---|---|---|---|---|---|---|---|---|
| 00 | 6.2 | 5.7 | 5.7 | 5.5 | 5.3 | 5.3 | 5.3 | 5.3 | 5.3 | 5.5 | 6.1 | 6.3 |
| 01 | 6.0 | 6.0 | 5.9 | 6.1 | 6.0 | 6.0 | 6.3 | 6.3 | 6.0 | 5.8 | 5.9 | 6.1 |
| 02 | 5.3 | 5.2 | 5.2 | 4.9 | 4.9 | 4.8 | 4.9 | 5.0 | 4.9 | 4.7 | 5.6 | 6.1 |
| 03 | 4.7 | 4.4 | 4.5 | 4.4 | 4.6 | 4.4 | 4.5 | 4.5 | 4.8 | 4.6 | 4.9 | 4.9 |
| 04 | 3.3 | 3.1 | 3.2 | 3.9 | 4.0 | 4.0 | 4.1 | 4.2 | 4.3 | 4.1 | 3.3 | 3.2 |
| 05 | 2.5 | 2.4 | 2.6 | 3.1 | 3.2 | 3.1 | 3.0 | 3.1 | 3.1 | 3.1 | 2.7 | 2.6 |
| 06 | 3.0 | 3.0 | 3.2 | 3.1 | 3.1 | 3.1 | 3.1 | 3.0 | 3.1 | 3.2 | 3.2 | 3.1 |
| 07 | 4.6 | 4.6 | 5.0 | 4.3 | 4.1 | 4.1 | 4.0 | 3.9 | 4.0 | 4.4 | 4.9 | 4.7 |
| 08 | *6.4 | 6.2 | *6.9 | 6.3 | 6.2 | 6.2 | 6.1 | 6.0 | 6.0 | 6.4 | *6.8 | *6.4 |
| 09 | 5.8 | 5.7 | 6.2 | 6.4 | *6.7 | 6.6 | 6.7 | 6.6 | 6.6 | *6.8 | 6.5 | 6.3 |
| 10 | 5.0 | 5.0 | 5.3 | 5.5 | 5.5 | 5.5 | 5.3 | 5.4 | 5.5 | 5.6 | 5.1 | 5.1 |
| 11 | 2.6 | 2.6 | 2.7 | 4.2 | 4.5 | 4.4 | 4.2 | 4.3 | 4.4 | 4.2 | 2.6 | 2.5 |
| 12 | 1.5 | 1.5 | 1.5 | 2.1 | 2.3 | 2.3 | 2.2 | 2.2 | 2.3 | 2.2 | 1.5 | 1.4 |
| 13 | 1.3 | 1.2 | 1.2 | 1.4 | 1.5 | 1.5 | 1.4 | 1.5 | 1.4 | 1.4 | 1.1 | 1.0 |
| 14 | 1.2 | 1.2 | 1.2 | 1.2 | 1.2 | 1.2 | 1.2 | 1.2 | 1.2 | 1.2 | 1.0 | 1.0 |
| 15 | 1.8 | 1.7 | 1.7 | 1.6 | 1.5 | 1.5 | 1.5 | 1.5 | 1.4 | 1.5 | 1.5 | 1.3 |
| 16 | 2.7 | 2.5 | 2.8 | 2.0 | 1.8 | 1.8 | 1.7 | 1.7 | 1.6 | 1.8 | 2.5 | 2.1 |
| 17 | 2.9 | 2.8 | 3.0 | 2.7 | 2.7 | 2.7 | 2.5 | 2.5 | 2.5 | 2.5 | 2.6 | 2.4 |
| 18 | 4.6 | 4.5 | 4.6 | 3.3 | 3.1 | 3.1 | 3.2 | 3.0 | 2.8 | 3.2 | 4.2 | 4.2 |
| 19 | 6.1 | 6.0 | 5.9 | 4.8 | 4.5 | 4.6 | 4.5 | 4.4 | 4.4 | 4.7 | 5.9 | 6.1 |
| 20 | 5.9 | 5.9 | 5.7 | 5.7 | 5.6 | 5.6 | 5.7 | 5.8 | 5.8 | 5.6 | 5.9 | 6.0 |
| 21 | 5.8 | 6.1 | 5.8 | 6.1 | 6.3 | 6.4 | 6.5 | 6.5 | 6.6 | 6.1 | 6.2 | 6.3 |
| 22 | 5.4 | *6.7 | 5.3 | *6.5 | 6.6 | *6.8 | *7.0 | *7.1 | *6.9 | 6.7 | 5.3 | 6.0 |
| 23 | 5.2 | 6.0 | 5.0 | 5.1 | 5.0 | 5.1 | 5.1 | 5.2 | 5.1 | 5.0 | 4.9 | 4.9 |

FIG. 12

TOTAL DAY OFFERED LOAD:
PEAK HOUR:

WORLD REGION:     COUNTRY CODE:     COUNTRY NAME:     TYPE OF DAY: WE1

PERCENT OF TOTAL LOAD FOR EACH HOUR

| HOUR | JAN | FEB | MAR | APR | MAY | JUNE | JULY | AUG | SEPT | OCT | NOV | DEC |
|---|---|---|---|---|---|---|---|---|---|---|---|---|
| | 218805 | 229895 | 248228 | 264634 | 390228 | 282522 | 276068 | 292735 | 329501 | 299509 | 308910 | 305904 |
| | 8 | 8 | 8 | 9 | 9 | 9 | 22 | 9 | 9 | 9 | 8 | 21 |
| 00 | 6.1 | 5.8 | 5.9 | 6.1 | 7.8 | 6.7 | 6.0 | 5.9 | 7.5 | 6.5 | 6.0 | 5.9 |
| 01 | 6.7 | 6.3 | 6.3 | 6.2 | 8.5 | 6.3 | 6.0 | 5.9 | 6.8 | 6.2 | 5.5 | 5.5 |
| 02 | 4.1 | 3.9 | 3.8 | 4.1 | 3.9 | 4.2 | 3.9 | 3.7 | 3.9 | 3.7 | 3.5 | 3.6 |
| 03 | 2.7 | 2.6 | 2.6 | 2.6 | 2.2 | 2.7 | 2.6 | 2.4 | 5.1 | 2.5 | 2.5 | 2.5 |
| 04 | 2.0 | 1.9 | 1.9 | 1.9 | 1.6 | 1.9 | 1.9 | 1.8 | 1.9 | 1.9 | 2.0 | 2.0 |
| 05 | 2.1 | 2.1 | 2.2 | 1.8 | 1.5 | 1.8 | 1.8 | 1.7 | 1.8 | 1.8 | 2.2 | 2.3 |
| 06 | 3.3 | 3.4 | 3.6 | 2.8 | 2.3 | 2.9 | 2.7 | 2.5 | 2.7 | 2.8 | 3.4 | 3.5 |
| 07 | 5.6 | 5.4 | 5.6 | 4.8 | 4.7 | 5.1 | 4.8 | 4.6 | 5.1 | 4.9 | 5.7 | 5.3 |
| 08 | *8.0 | *8.2 | *8.5 | 7.3 | 10.9 | 7.7 | 7.1 | 7.7 | 8.1 | 7.6 | *8.6 | *7.8 |
| 09 | 7.1 | 7.1 | 7.1 | *7.8 | *15.4 | *8.1 | 8.1 | *9.4 | *9.5 | *8.5 | 7.4 | 6.9 |
| 10 | 7.2 | 7.3 | 7.5 | 6.5 | 7.2 | 6.4 | 6.3 | 7.1 | 6.4 | 7.0 | 7.3 | 6.9 |
| 11 | 3.0 | 3.2 | 3.1 | 5.7 | 5.2 | 6.0 | 5.4 | 5.9 | 5.6 | 5.8 | 2.9 | 2.9 |
| 12 | 1.4 | 1.4 | 1.4 | 2.2 | 1.9 | 2.3 | 2.2 | 2.2 | 2.3 | 2.3 | 1.3 | 1.3 |
| 13 | .8 | .8 | .7 | 1.0 | .8 | 1.1 | 1.0 | 1.0 | 1.0 | 1.0 | .6 | .6 |
| 14 | .6 | .6 | .6 | .6 | .4 | .6 | .6 | .6 | .6 | .6 | .4 | .5 |
| 15 | .8 | .8 | .7 | 1.1 | .7 | .9 | .8 | .5 | .5 | .5 | .7 | .7 |
| 16 | 1.9 | 1.8 | 2.0 | 1.1 | 1.7 | 2.1 | 2.0 | .8 | .7 | .9 | 1.8 | 1.8 |
| 17 | 2.2 | 2.1 | 2.3 | 2.3 | 1.9 | 2.8 | 2.9 | 2.0 | 1.8 | 2.1 | 2.2 | 2.1 |
| 18 | 3.6 | 3.6 | 3.8 | 2.9 | 2.9 | 4.2 | 4.4 | 2.7 | 2.2 | 2.9 | 3.9 | 3.9 |
| 19 | 5.4 | 5.5 | 5.4 | 4.4 | 4.0 | 5.8 | 6.4 | 4.2 | 3.4 | 4.3 | 5.9 | 6.3 |
| 20 | 6.2 | 6.3 | 6.2 | 6.1 | 4.6 | 6.7 | 7.6 | 6.1 | 5.1 | 6.0 | 7.1 | 7.4 |
| 21 | 6.6 | 6.7 | 6.5 | 7.0 | 5.2 | 7.5 | *8.6 | 7.1 | 6.0 | 7.3 | 7.0 | *7.8 |
| 22 | 6.4 | 6.7 | 6.3 | 7.7 | 5.2 | 7.5 | 8.6 | 8.2 | 6.8 | 7.4 | 6.4 | 6.3 |
| 23 | 6.5 | 6.5 | 6.2 | 6.7 | 4.6 | 5.9 | 6.6 | 6.2 | 5.3 | 5.9 | 5.9 | 6.3 |

FIG. 13

WORLD REGION:     COUNTRY CODE:     COUNTRY NAME:     TYPE OF DAY: WE2

TOTAL DAY OFFERED LOAD:
PEAK HOUR:

| HOUR | JAN | FEB | MAR | APR | MAY | JUNE | JULY | AUG | SEPT | OCT | NOV | DEC |
|---|---|---|---|---|---|---|---|---|---|---|---|---|
|  | 250249 | 264992 | 274187 | 297328 | 407180 | 315409 | 296933 | 310165 | 343353 | 335003 | 335582 | 315644 |
|  | 10 | 8 | 8 | 9 | 23 | 9 | 9 | 9 | 23 | 9 | 8 | 8 |
| 00 | 5.7 | 6.7 | 5.9 | 5.7 | 4.5 | 6.3 | 6.3 | 6.1 | 5.5 | 5.9 | 5.8 | 6.3 |
| 01 | 6.1 | 7.5 | 6.0 | 6.2 | 4.7 | 6.5 | 6.8 | 6.5 | 5.6 | 5.5 | 5.5 | 5.8 |
| 02 | 4.1 | 4.5 | 4.1 | 4.1 | 3.2 | 4.2 | 4.3 | 4.1 | 3.7 | 3.9 | 3.9 | 4.1 |
| 03 | 2.6 | 2.7 | 2.5 | 2.9 | 2.2 | 2.9 | 3.1 | 2.8 | 2.6 | 2.8 | 2.6 | 2.8 |
| 04 | 1.7 | 2.0 | 2.0 | 2.2 | 1.6 | 2.1 | 2.3 | 2.0 | 2.0 | 2.1 | 1.9 | 2.1 |
| 05 | 1.9 | 2.2 | 2.2 | 1.9 | 1.5 | 1.9 | 2.0 | 1.8 | 1.7 | 1.9 | 2.2 | 2.3 |
| 06 | 3.3 | 3.7 | 3.8 | 3.0 | 2.3 | 2.9 | 3.0 | 2.6 | 2.6 | 2.8 | 3.2 | 3.3 |
| 07 | 5.9 | 6.2 | 6.2 | 5.1 | 4.0 | 4.9 | 5.0 | 4.8 | 4.7 | 5.0 | 5.8 | 5.8 |
| 08 | 8.8 | *8.2 | 9.3 | 8.3 | 6.5 | 7.7 | 8.2 | 8.3 | 7.2 | 8.1 | *8.7 | *8.4 |
| 09 | 8.1 | 7.6 | 7.9 | *8.9 | 7.2 | *8.3 | *8.9 | *10.0 | 8.6 | *8.6 | 8.0 | 7.9 |
| 10 | *8.9 | 7.8 | 7.6 | 7.0 | 4.9 | 6.6 | 6.8 | 6.7 | 6.4 | 7.5 | 8.4 | 7.9 |
| 11 | 3.8 | 3.8 | 3.7 | 6.3 | 4.8 | 6.1 | 6.2 | 6.0 | 6.0 | 5.9 | 3.6 | 3.3 |
| 12 | 1.8 | 1.7 | 1.8 | 2.7 | 2.1 | 2.5 | 2.6 | 2.5 | 2.4 | 2.5 | 1.8 | 1.6 |
| 13 | 1.0 | .9 | 1.0 | 1.3 | 1.0 | 1.3 | 1.2 | 1.3 | 1.3 | 1.3 | .9 | .9 |
| 14 | .7 | .6 | .6 | .7 | .6 | .7 | .7 | .8 | .7 | .8 | .6 | .6 |
| 15 | .7 | .7 | .7 | .6 | .4 | .6 | .6 | .6 | .5 | .6 | .6 | .6 |
| 16 | 1.8 | 1.7 | 1.8 | 1.0 | .7 | .8 | .8 | .8 | .7 | .9 | 1.6 | 1.6 |
| 17 | 2.1 | 2.1 | 2.3 | 2.0 | 1.7 | 2.0 | 2.0 | 1.9 | 2.0 | 2.1 | 2.2 | 2.3 |
| 18 | 3.3 | 3.4 | 3.6 | 2.8 | 2.2 | 2.7 | 2.7 | 2.6 | 2.5 | 2.9 | 3.7 | 3.7 |
| 19 | 4.0 | 4.2 | 4.3 | 3.9 | 3.4 | 3.8 | 3.9 | 3.7 | 4.0 | 4.1 | 4.5 | 4.8 |
| 20 | 4.2 | 4.2 | 4.3 | 4.5 | 4.1 | 5.3 | 4.4 | 4.5 | 4.6 | 4.8 | 4.8 | 4.8 |
| 21 | 4.7 | 4.6 | 4.7 | 4.9 | 5.1 | 5.0 | 4.9 | 5.0 | 5.4 | 5.3 | 5.4 | 5.3 |
| 22 | 7.5 | 6.6 | 7.0 | 6.9 | 5.3 | 7.3 | 6.8 | 7.3 | 8.9 | 7.4 | 7.4 | 7.3 |
| 23 | 7.6 | 6.7 | 6.6 | 7.3 | *16.0 | 7.7 | 7.1 | 7.5 | *10.3 | 7.4 | 7.0 | 6.9 |

PERCENT OF TOTAL LOAD FOR EACH HOUR

METHOD FOR MONITORING TELEPHONE COMPLETION DATA

TECHNICAL FIELD

The invention relates to a method for monitoring telephone completion data, and more particularly, to a method for monitoring telephone completion data to forecast the economic benefit improvement in augmenting international telephone call completion as a guide for implementing engineering changes, by calculating the incremental profitability which would result from the improvement in call completion in given countries.

PROBLEM

The international network environment of international telephone operating companies such as AT&T (also referred to as international exchange carriers or interexchange carriers) is today experiencing considerable growth. Such growth, coupled with the rise of competition from other international or domestic interexchange carriers, has driven international telephone operating companies to maximize profitability in conjunction with providing a high level of international telephone service.

The maximization of profitability in conjunction with good quality service requires at least two determinations. First, one needs to determine whether the international telephone trunk groups are being engineered to maximize profitability. Second, an identification must be made of countries which the interexchange carrier would benefit most from an improvement in call Answer Seizure Ratio (ASR). These determinations must also be considered within the framework of the international telephone network environment.

Referring to FIG. 1, at present most international telephone calls originating in the United States and destined for a foreign country proceed through number of hurdles. First, they must reach a so-called Regional Bell Operating Company (RBOC) end office 2. Next, they are routed to an international exchange carrier toll switch 4. Finally, the calls will leave the U.S. through an International Switching Center (ISC) 6 prior to proceeding overseas over a trunk group 8. In a similar manner, a call originating in a foreign country must leave that country through their end office (10), toll switch 12 and ISC 14 before continuing on to the U.S. The "trunk group" 8 connects the two ISCs 6 and 14, and telephone traffic between the two countries is provided via that group.

The revenues from international phone service will typically depend on several factors. These include: traffic demand; blocking of calls in the networks in the affected countries (including blocking occurring in the RBOC network, the interexchange carrier toll network, and the international and foreign networks); billing tariffs; accounting rates; and collectible revenue to be received by the interexchange carrier. In the U.S., for example, the AT&T-USA toll network blocking is held to approximately 0.1% at busy hours, while the RBOC network blocking is also low when both of these blocking levels are compared with blocking which occurs internationally and in foreign countries. The major factors contributing to high blocking for international calls are either the lack of international circuits or poor foreign country network call completion.

At present a so called "Planning System for International" engineering standard (PSI) is used to engineer telephone networks in the United States. The PSI engineering standard utilizes, for example, an output of data derived from various so-called "servicing" systems used by interexchange carriers. One such servicing system is the AT&T Network SERvicing (ANSER) system, which provides so-called "first attempt offered load" data for the "busy month-busy hour" time period of telephone circuit use. The PSI method requires that traffic traveling on an international trunk group will experience a 1% blocking level. This level guarantees that the trunk group will carry 99% of the Average Business Day Busy Hour (ABDBH) call traffic offered to it under normal conditions.

The typical servicing system such as ANSER uses a call-retrial model to approximate call traffic conditions ("offered loads"), in an attempt to determine network engineering levels which will be required to meet load demands. In the current ANSER system, the re-trial model employed is often referred to as the "One-Link Retrial Model", and that model is diagrammatically depicted at FIG. 3. The one-link model does not take into account load blocking which occurs in foreign telephone networks. That is, the model assumes a perfect Answer Seizure Ratio (ASR) of 1—the model assumes that a customer placing an international call will reach the called party on the first attempt should the call be seized by the international trunk. However, should the customer's initial attempt to exit the domestic ISC fail, a customer may decide to try to place the call again or might even abandon his attempts to call. If the customer tries again, the procedure would be repeated.

Referring to FIG. 3, "a" represents the offered load for first call attempts; "a'" is the total offered load, including reattempts; "B" is the call blocking; "u'" is the carried load; and "$P_r$" is the call retrial probability—the probability that a customer will re-try his call. Briefly described, a customer attempting to complete a call to a foreign gateway is represented by the first offered load, "a". Should the customer reach the destination party on the first attempt his call will immediately be taken into account in the carried load, "u'", emanating from the ISC. However, should the customer not be successful on his first call attempt, he may in some likelihood either (1) attempt to re-complete the call, or (2) he may quit. The sum of a given customer's potential "reattempt" actions, depicted by branch 20, is mathematically defined as the product of the total offered load (a') times a function of the blocking rate, B. The percentage of customers who will "quit" in their efforts to reach their destination (branch 22) is represented by the formula: a'×B (1–$P_r$). Those customers who will, in fact, continue to re-attempt making calls (i.e., those customers who will perform "retrials", branch 24) is mathematically defined by a function of the total offered load, a', times the blocking rate, B, times the retrial probability, $P_r$.

In the steady status, where callers either reach their destination immediately, continually re-attempt or continually quit, the total offered load, including reattempts, a', will equal:

$$a'=a+a'\times B(a', T)\times P_r$$

Therefore, the PSI retrial model provides that the total carried load a' for the network is $$a' = \frac{a}{1 - B(a',T) \times P_r} \quad (1)$$

and determines that the first attempted offered load "a", will equal $$a = \frac{u' \times (1 - B(a',T) \times P_r)}{1 - B(a',T)} \quad (2)$$

The current international telephone network, such as that employed by AT&T, is typically engineered according to the ANSER method based on the one-link retrial (PSI) model of FIG. 3 for the "busy-month busy-hour" time period. For instance, in AT&T Network SERvicing (ANSER) systems, a so-called busy month- busy hour first attempt offered load ("a") is estimated utilizing the measured carried load (u') and the blocking rate (B) occurring due to no-circuits on the international link between AT&T and foreign country ISCs, given a measured retrial probability (Pr). As has been illustrated, the one-link retrial model according to the current methods does not explicitly consider the re-attempted calls due to the foreign country internal telephone network blocking.

Thus, in attempting to forecast conditions useful to determine the number of circuits needed between gateways or to otherwise determine the benefits which would be derived from circuit improvement, the current one-link model fails to account for the effects attributable to Answer Seizure Ratio (ASR); the model is somewhat inaccurate in that it assumes an answer seizure ratio of 1. The first attempt offered load estimated by this model will be exactly right only when the ASR equals 1, and it will tend to overestimate the first attempt offered load for a country with low ASR by neglecting ASR effects (when a call is blocked and the customer retries, there is a higher chance the reattempted call will be blocked again; therefore the average holding time for the retries is shorter than the average holding time of first attempt offered calls, and the model will overestimate the load in that regard).

Other factors must also be taken into account in determining circuit additions for improvements. For example, a call leaving the U.S. must first reach an ISC, travel across the international network to the destination ISC, and finally be routed by the foreign country to the termination point. Domestic international telephone carriers typically have little control over network engineering or performance in foreign countries, despite the fact that international trunk groups are oftentimes engineered and maintained jointly by the U.S. and foreign carriers. Thus, the current engineering "Grade Of Service" (GOS) on the international trunk groups does not determine the GOS experienced by a customer making an international call, and international calls originating in the U.S. are not guaranteed a set grade of service.

Other concerns with the current PSI process also exist. These include:

1. A lack of the PSI process to assess cost for a network plan and to base such cost into the engineering process.
2. A lack of the PSI process to provide an explicit connection between network design and the desires of the interexchange carrier sub business units (SBU's) in terms of the direct measurements of quality used by the SBU's.
3. The relationship between the engineering criterion of 1% "gateway-to-gateway" blocking upon the revenue requirements of the SBU's.
4. PSI's lack of assessing other traffic problems other than those occurring during the so-called busy season, busy hour, as international phone carriers typically after a multitude of services with traffic loads occurring at times other than busy season, busy hour, each with their own traffic profiles and performance requirements.

Thus, it is an object of the invention to provide a method for monitoring telephone completion data for evaluating the incremental profitability (or loss) resulting from adding telephone circuits between a domestic carrier and a foreign country gateway.

It is a further object of the invention to provide a method for monitoring telephone completion data to identify maximum profitability gains resulting from international telephone circuit additions for affected countries.

It is yet another object of the invention to provide a method for monitoring telephone completion data to provide a rank order list of countries that identifies the economic benefits of adding international telephone circuits to those countries.

It is still another object of the invention to provide a method for monitoring telephone completion data to calculate the incremental revenue gains (both for the domestic interexchange phone carrier and for the foreign telecommunications administration (TA) receiving payment from the domestic carrier) for every percentage point improvement in ASR in a foreign country.

It is yet still another object of the invention to provide a method for monitoring telephone completion data to provide a rank order list of countries that identifies the economic benefits of a given percentage of ASR improvement.

It is yet still another object of the invention to provide a method for monitoring telephone completion data to provide estimates of blocking between domestic interexchange carriers and a foreign country.

It is yet still another object of the invention to provide a method for monitoring telephone completion data to identify country economic grade of service (EGOS) objectives for engineering the international circuits based on network performance and economic parameters.

It is yet still another object of the invention to provide a method for monitoring telephone completion data to develop a tool for studying the effects of changes in traffic demand, network capacity and economic parameters on the performance and profitability of international service.

The foregoing specific objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations, which may be apparent to those skilled in the art. Accordingly, the present invention resides in the novel parts, constructions, arrangements, combinations and improvements herein shown and described.

SOLUTION AND SUMMARY OF THE INVENTION

Based on the end-to-end international telephone operating network, the above-described problems are solved by providing a method according to the invention of monitoring telephone completion data utilizing a model for evaluating the economic worth of international call completion service improvements. For convenience, the overall model employed in the method according to the invention will be referred to as the Economic Optimization of Networks (ECON) model, and is diagrammatically depicted at FIG. 2. The method and model according to the invention provides a ready way for estimating the incremental profitability realized from engineering efforts to improve call completion in the networks. The method and model utilize call completion data to identify countries where there is most likely to be a realization of profit resulting from improved call completion.

The method and model according to the invention may be implemented in various ways including various hardware components such as computers or the like and software utilized therein for carrying out the various steps and calculations according to the method and model of the invention. The method and model according to the invention employs a novel two-link call retrial model for calculating various loads and capacities and for otherwise accounting for blocking rates and the answer seizure ratios which will be encountered in the international telephone network. By properly accounting for these factors in the international network, the method and model in accordance with the invention may arrive at accurate forecasts for loads and capacities useful to assess network engineering needs. The output from the two-link retrial model can be used in conjunction with the economic-determinations in accordance with the method and model of the invention to aid network planners in future engineering decisions.

The method according to the invention thus illustrates that a poor call completion rate results in lost revenues from unfulfilled demand and increases the direct expenses from handling ineffective attempts. The outputs of the model can be used by telephone network planners or strategic planners to help, for example in 1) the evaluation of the incremental profitability (or loss) resulting from adding telephone circuits between a domestic interexchange carrier and a foreign country gateway; 2) the estimation of maximum profitability gains due to international circuit additions for each country; 3) a list in rank order of profitability gains to be made by adding circuits in each of the affected foreign countries; 4) the incremental revenues gained (for the interexchange carrier and for revenues gained by the telecommunications administrator as revenue received from the interexchange carrier) for given percentage point improvements in the telephone call answer seizure ratio (ASR) in a foreign country; 5) a list in rank order of countries, identifying the benefits of percentage ASR improvement; 6) the estimation of end-to-end call blocking between domestic interexchange phone carriers and a foreign country; and 7) the identification of a country's Economic Grade Of Service (EGOS) objectives for engineering the international circuits based on network performance and economic parameters. Other uses of the outputs of the method and model will become and/or will be readily apparent to those skilled in the art.

As will become apparent, by applying the method as herein described and by following its recommendations for engineering improvement, the number of completion calls available to customers will be significantly increased, thereby maximizing a domestic interexchange carrier's measured operating income (MOI) and the quality of international services.

BRIEF DESCRIPTION OF THE DRAWINGS

FIG. 11 is a diagrammatic table of peak-off-peak load profile for an average business day as may be employed with the method according to the invention.

FIG. 12 depicts a diagrammatic table of peak-off-peak load for a first weekend day as may be employed with the method according to the invention.

FIG. 13 depicts a diagrammatic table of peak-off-peak load for a second weekend day as may be employed with the method according to the invention.

DETAILED DESCRIPTION

Typically, domestic carrier network blocking—for example, the AT&T-USA toll network blocking and RBOC network blocking—are about 0.1% at the so-called "busy season busy hour" time frame. This level of blocking represents a negligible percentage when compared with the blocking rate in the international telephone network itself and the blocking rate occurring in a foreign countries. For authorized telephone calls, the ECON method (and model therefor) according to the invention will account for a call proceeding from a domestic carrier's ISC through the foreign country's ISC, then through the foreign domestic network, and finally to the termination point: the destination customer. For incoming calls, a domestic interexchange carrier will have little control over the network engineering or performance in foreign countries. Thus, the method and model will account for an incoming call from the foreign country's ISC through a domestic carrier's ISC, then through the domestic carrier's phone network and finally to the termination point: the destination customer.

The present invention is thus directed to a method and model for monitoring telephone completion data to assess the economic worth of implementing international call service improvements so as to estimate the incremental profitability for call completion improvement. By applying or deriving data employing the ECON method and model according to the invention, countries can be identified where there would most likely be a good economic return as a result of engineering modifications for improved call completion.

Figure 1:
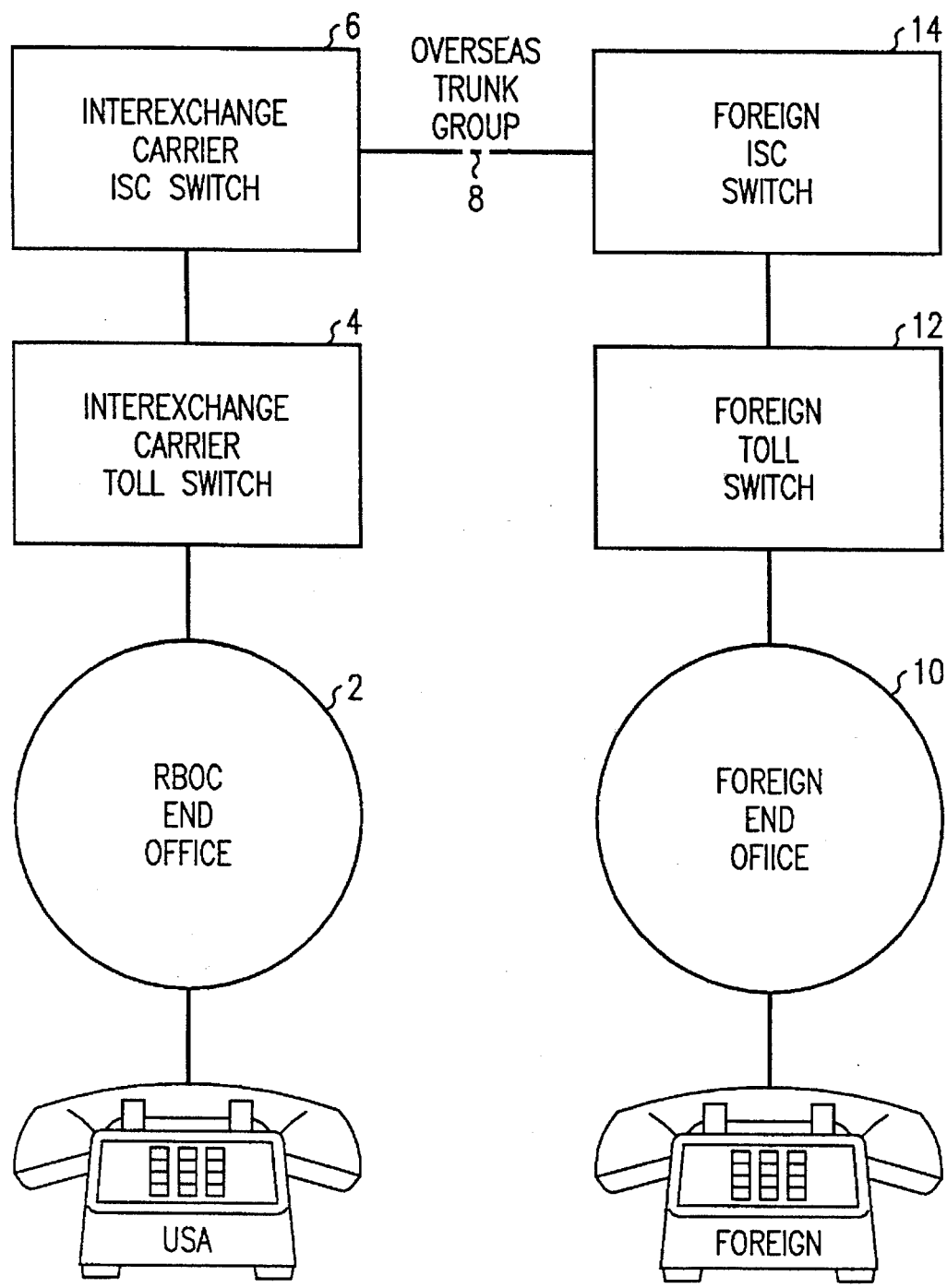
FIG. 1 is a diagrammatic illustration an international long distance telephone network.
Figure 2:
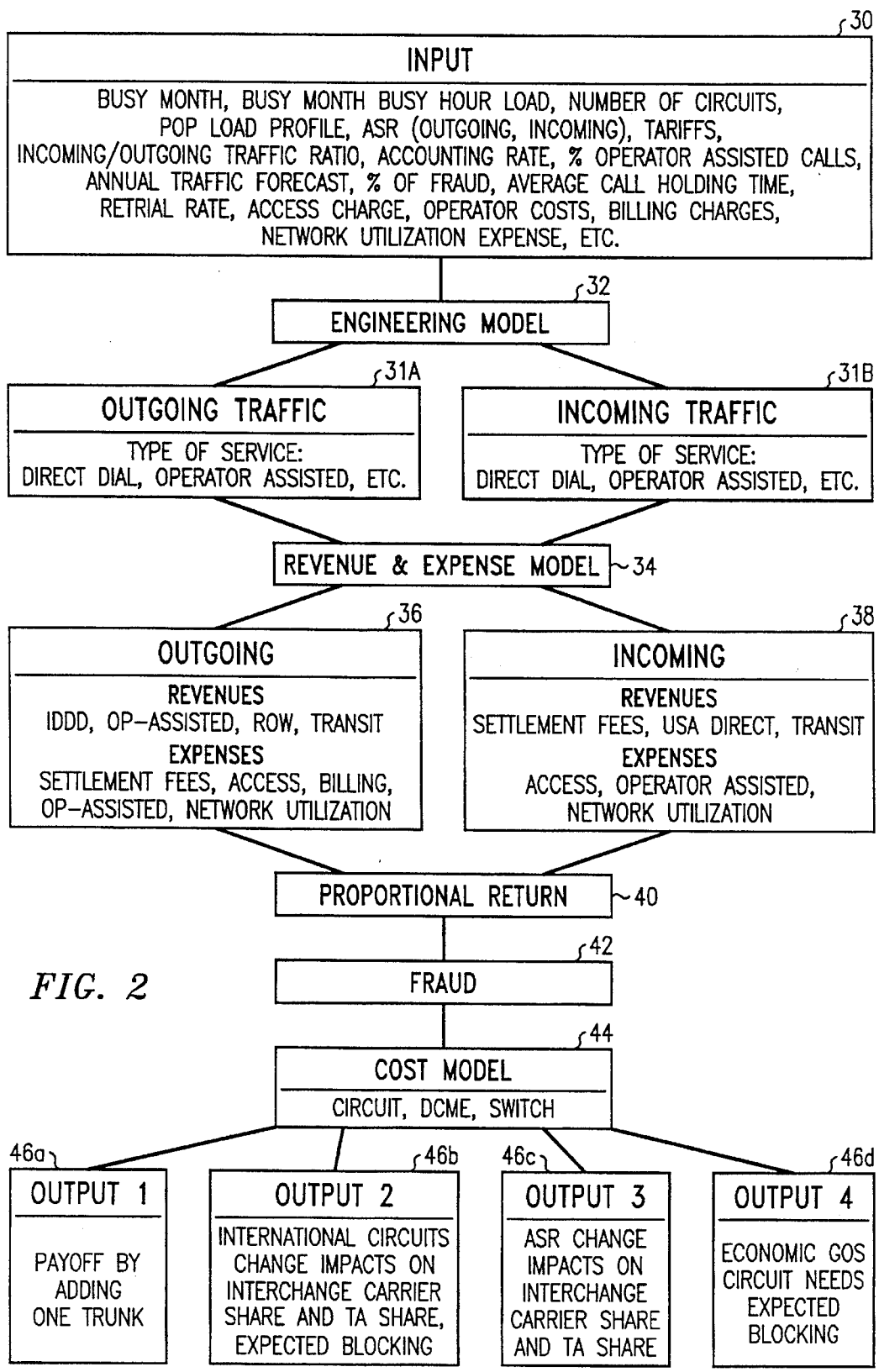
FIG. 2 is a broad depiction of the method employing Economic Optimization of Networks Model according to the invention.

As depicted by FIG. 2, a purpose of the ECON engineering method according to the invention is to assess telephone call completion data in an effort to estimate the outgoing and incoming billable and unbillable traffic; that is, to implement a method to estimate—to forecast—the incremental billable load resulting by either adding international circuits or improving the foreign network telephone call completion rate.

For ease of explanation and understanding, reference will be made to FIG. 2 which illustrates, in diagrammatic form, the ECON model utilized in the method according to the invention. As described, the method and model serve to estimate the incremental measured operating income (MOI) a domestic interexchange carrier will gain and the incremental settlement fee the foreign telecommunications administrator (TA) will receive from a domestic interexchange carrier if either international telephone circuits are added or the foreign country ASR is improved. Measured Operating Income (MOI) is normally defined as a carrier's revenues less settlement fees, costs and expenses (excluding interest and income taxes, plus other miscellaneous income). The ECON method may also serve to assist network planners to determine logically the economic grade of service circuit needs based on the incremental MOI. The algorithms associated with each function of the model, as well as the inputs and outputs therein, are described in the following.

It is, of course, understood and appreciated by those skilled in the art that the method and model according to the invention can be carried out utilizing, for example, various computer hardware components and appropriate software written to carry out the various steps and calculations embodied in the method and model as will be described in detail herein.

Referring to FIG. 2, the ECON method according to the invention accounts for a plurality of input data (30) which will factor into the economic analysis according to the model. Input data will typically be provided for each country which is to be modeled. Input data 30 may include:

(1) Foreign country name;
(2) Busy-month—the month with the highest traffic demand for that country;
(3) "Busy-month-busy hour" load;
(4) Peak-Off-Peak (POP) load profile data for the specified country;
(5) Number of circuits between the U.S. and the affected country;
(6) Incoming/(incoming+outgoing) traffic ratios for carried loads;
(7) Retrial telephone probabilities;
(8) ASRs for outgoing and incoming international calls;
(9) Average holding time for outgoing and incoming calls;
(10) Percentage of operator handled calls for outgoing and incoming traffic;
(11) Specific billing tariffs for the various telephone services provided by domestic interexchange phone carriers;
(12) Accounting rates—the exchange rate mechanisms used in international accounting rates include SDR (Special Drawing Rights), GFC (gold franc) and U.S. dollars. For convenience and calculation purposes the method and model have assumed certain conversion: U.S. $1=2.5374 GFC and 1 SDR=3.061 GFC.
(13) Access charges—for each international call, whether the call is completed or not, an interexchange carrier has to pay the RBOC a certain amount of access fee which will be known to the affected interexchange carrier.
(14) Operator-assisted cost—this number is estimated by dividing the total interexchange operator expense by the total call attempts which will be known to the affected interexchange carrier.
(15) Billing charge—for each international completed call, the interexchange carrier has to pay the RBOC a certain billing charge which will be known to the affected interexchange carrier.
(16) Network utilization expense—for each international call, whether the call is completed or not, there is a network utilization expense associated with the call which will be known to the affected interexchange carrier.
(17) Annual traffic forecast according to the various telephone services (and associated tariffs) offered by the interexchange carriers; to estimate economic results as accurately as possible, the method and model apply correspondent tariffs to correspondent traffic.
(18) Percent fraud—the percentage of fraud to estimate to assess of uncollectible revenue. Uncollectible revenue is earned revenue which the company is legally entitled to yet which is either impossible or impractical to collect.

Other factors and data known to or apparent to those skilled in the art can be applied to the method and model according to particular operating characteristics of a given interexchange carrier.

FIG. 2, step 32 is diagrammatic of a phone call "retrial model" which will assist in implementing engineering of system networks in accordance with the ECON method of the invention. In the following re-trial models to be discussed, the Erlang loss system as known to those skilled in the art has been employed to pattern call behavior. By the Erlang loss system, any customer who finds all servers busy is assumed to return with a certain retrial probability and place another request for service at some later time, the customer persisting in this manner until he/she receives service.

Figure 4:
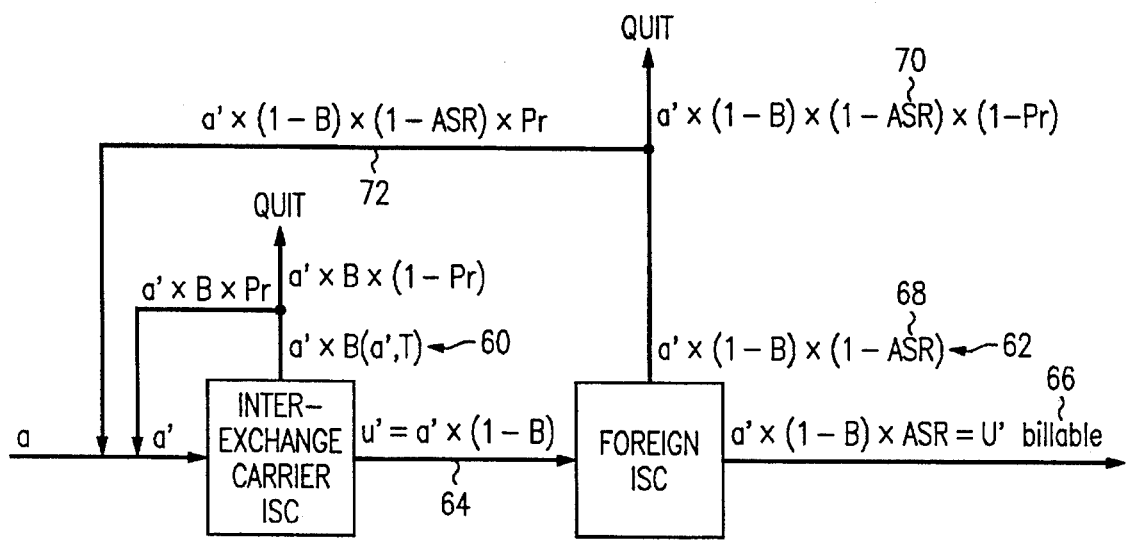
FIG. 4 depicts a "Two-Link Retrial Model" employed in accordance with the ECON method and model of the invention.

There is thus provided according to the ECON method of the invention a phone call retrial model for accounting for telephone ASR to accurately forecast the anticipated phone loads which will be required to be met by the network, to this guide network planners in engineering decisions. The phone call retrial model, which may also be referred to as the Modified Two-Link Model, is depicted at FIG. 4.

Figure 3:
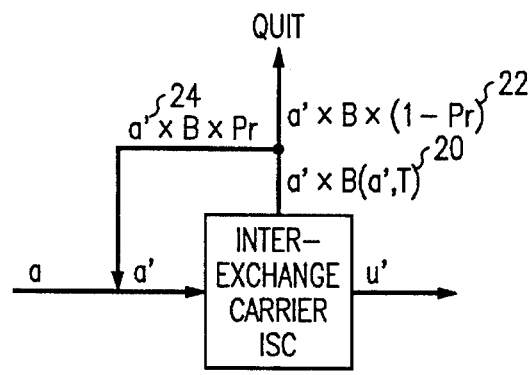
FIG. 3 illustrates a "One-Link Retrial Model" employed in the PSI engineering process.

The phone call retrial model employed in the ECON method according to the invention accurately realizes that an international call from the U.S. to a foreign country can be blocked either in the international telephone network (the network trunks) or it can be blocked in the internal network of the foreign country. In addition, the method and model according to the invention also takes into account the fact that a call will sometimes not complete, for example, because the called number is busy, or because there is no answer. Thus, the retrial model according to the invention is more accurate than the One-Link model (FIG. 3) employed, for example, in the PSI system, in that the one-link model cannot be used as an international retrial model because it neither considers the blocking in the internal network of the foreign country nor considers that a call will not complete if the destination is busy or otherwise unavailable for answer. The Two Link Model thus proves useful to accurately assist network planners in implementing engineering decisions.

For ease of understanding, the Two Link Retrial Model used in the ECON method according to the invention can be characterized as including a "domestic" call retrial portion and an "international" call retrial portion. For convenience the domestic portion of the model is broadly denoted by numeral 60 while the international portion of the model is broadly denoted by numeral 62.

Similar to the One-Link Model, the domestic retrial portion 60 will include a load of first attempt calls, "a" which are immediately successful to factor into the carried load, "u'". There will also be a number of domestically blocked calls which will be either retried by the customer or abandoned by him. Thus, as in the one-link approximation, the total number of retry attempts due to no-circuit blocking for the domestic portion 60 of the two-link retrial ECON model can be represented as $a' \times B \times P_r$.

The ECON model according to the method of the invention also factors in the ASR occurring in the foreign international and domestic networks, owing to blocking occurring in those networks. The two-link re-trial model will factor in re-trial attempts due to blocking in the foreign country domestic telephone network. Referring again to FIG. 4 and in particular to the international portion 62 of the model, the portion of the carried load, u', which makes it through blocking occurring in the international trunks will equal the total offered load, a', multiplied by (1-blocking ratio, B) (branch 64). This portion of the carried load u' thus enters the foreign carrier ISC to be segregated into (1) a billable carried load, $U'_{billable}$, which represents the aggregate load of revenue-generating calls for which the interexchange carrier will actually be able to collect fees from a customer, and (2) unbillable portions of the carried load which will represent the portion of the carried load u' which will incur cost upon the interexchange carrier without receipt of offsetting revenue by him.

For the international portion 62 of the two-link retrial model, a call which makes it through trunk blocking might immediately make it through the foreign ISC, in which case $U'_{billable}$ will equal $a' \times (1-B) \times ASR$ (branch 66). The portion of the carried load, U', which is blocked at the foreign ISC level (representative of foreign network blocking; busy attempts; no one home, etc) will equal $a' \times (1-B) \times (1-ASR)$ (branch 68). It is this portion of the carried load which is subjected to the same retrial dilemmas as in the domestic portion of the retrial model according to the method of the invention. Some customers will elect to "quit", and that portion of the carried load equals $a' \times (1-B) \times (1-ASR) \times (1-P_r)$ (branch 70). However, some customers will continue call reattempts in the hopes of reaching their intended destinations, and that portion of the load equals $a' \times (1-B) \times (1-ASR) \times P_r$ (branch 72).

Thus, in the two-link retrial model according to the method of the invention, the estimation of the total offered load, a', factoring in both the domestic and international retrial portions of the model, is given by the equation:

$$a' = a + a' \times B \times P_r, a' \times (1-B) \times (1-ASR) \times P_r$$

or $$a' = \frac{a}{1 - B_{end-to-end}(a',T) \times P_r} \quad (3)$$

(where $B_{end-to-end}$ represents the rate of blocking from the origination (domestic) point of the call to the destination (international) point of the call).

Taking into account the ASR, the first attempt offered load, "a" can thus correctly be approximated by the formula:

$$a = \frac{u'_{billable} \times (1 - B_{end-to-end}(a',T) \times P_r)}{1 - B_{end-to-end}} \quad (4)$$

where $$B_{end-to-end}(a',T) = 1 - (1 - B_{intl}(a',T)) \times ASR \quad (5)$$

and where the end-to-end call completion rate, $C_{end-to-end}$, can be approximated by $$C_{end-to-end} = (1 - B_{intl}(a',T)) \times ASR \quad (6)$$

If the ASR were equal to 1 (that is, there is no answer and no call blocking in the foreign country domestic telephone network) the total offered load, a', would equal $$a' = \frac{a}{1 - B_{intl} \times P_r}$$

which, as can be seen, is the equation approximated by the one-link model.

At present, it is believed that current resources will only provide data regarding billable traffic; that is, it is believed that current resources are generally lacking in that they can only provide certain historical data regarding call activity and lack a forecasting capability for certain data including loads, blocking and the like which would be necessary to make engineering decisions. For instance, typical data such as the total carried load, u' and the blocking ratio, B, are not maintained by interexchange carriers after the total first attempt offered load "a" is calculated by ANSER (there would be too much data to keep). As will be apparent from the previous discussion, certain of the omitted data is required to make the calculations and to provide forecasts useful for engineering planning for the method according to the invention.

In order to apply the method and model according to the invention, an approximation may be devised utilizing the first attempt offered load data, "a", that is originally obtained from a servicing system such as ANSER. This value of "a" may be used in conjunction with the servicing (ANSER) system (i.e., the one-link model) equations to "re-engineer" the carried load data, u', and the blocking ratio, B. Having those values, and knowing the first attempt offered load "a" that is calculated from ANSER, the two-link model may then be used to calculate the offered load including reattempts (a') by equation (3), to estimate the total billable carried load, utilizing equation (7), i.e., $$U_{billable} a' \times (1 - B_{end-to-end}) \quad (7)$$

This is a constraint calculation of the billable carried load which must be satisfied if the accuracy of the two-link model's forecasts are to be verified.

As has been previously explained, the first attempt offered load "a" that will be calculated by a typical servicing system such as the ANSER system using the one-link model is inaccurate in that it does not account for ASR. In its present form, then, "a" as calculated by ANSER is inaccurate and cannot be used as solved by PSI in the method according to the invention. One solution is to utilize the first value of "a"

derived by ANSER and reengineer same as described above for values of B and U', and then to conduct a series of iterations utilizing the Two-Link model to "guesstimate" a correct value for the first attempted offered load, "a".

Thus, the first calculated value of "a" as derived from the two-link retrial model is applied to a series of constraint equations in an effort to converge the calculated first attempt offered load, "a" with the constraint equation to satisfy the accuracy of the model. Should the constraint not be met, the value of "a" calculated from the two link model would be re-applied to the ANSER equations to obtain a second set of re-engineered values for B and U'. These in turn would be utilized in the two-link calculations according to the invention to derive a second calculated value for the first offered load, "a". This second calculated value would again be checked against the constraint equation for convergence with the model; and in this manner of iteration, an accurate value for the first attempt offered load, "a", would be forecast according to the method of the invention.

To meet the constraint, the first attempt offered load "a" estimated by PSI is applied to equation (8) to determine the total carried load.

$$U_{carried} = \frac{a \times (1 - B(a',t)_{intl})}{1 - B(a',t)_{intl} \times P_r} \quad (8)$$

where $U_{carried}$ is the carried load, u', estimated from PSI and the blocking ratio, B, may be calculated from the Erlang loss system as known to those skilled in the art.

$U_{carried}$ can also be approximated by the formula $$U_{carried} = U_{billable\ calls\ (BC)} + U_{unbillable\ calls\ (UBC)} = U_{BC} + U_{BZ,RNA,other\ incompleted\ calls}$$

where BZ stands for busy calls, and RNA stands for ring no answer calls. The percentage of the billable carried load (BC) is thus defined as $$BC\% = \frac{U_{BC}}{U_{BC} + U_{BZ,RNA,others}}.$$

where the portion of BC% represented by calls from a domestic interexchange carrier to a foreign ISC, considering the average holding time of an outgoing call, $HDT_{out}$, is given as $$BC_{out}\% = \frac{<HDT_{out}>_{BC} \times ASR_{out}}{<HDT_{out}>_{BC} \times ASR_{out} + <HDT>_{BZ,RNA,others}}$$

and where the portion of BC% represented by calls from a foreign ISC to a domestic interexchange carrier, considering the average holding time of an incoming call, $HDT_{in}$, is given as $$BC_{in}\% = \frac{<HDT_{in}>_{BC} \times ASR_{in}}{<HDT_{in}>_{BC} \times ASR_{in} + <HDT>_{BZ,RNA,others}}$$

In both cases, "HDT" represents the holding time for a call. Thus, the billable load $U_{BC}$ is calculated as $$U_{BC} = U_{carried} \times BC\%$$

and the total offered load, including reattempts, will be equal to $$a' = \frac{U_{BC}}{(1 - B_{intl}) \times ASR}$$

As can be seen, then, the total offered load, including reattempts, a' will be equal to equation (3), $$\left(\frac{a}{1 - B_{end-to-end} \times P_r}\right),$$

which is the value of a' derived from the two link model. When this constraint is met, the value of a' will have been accurately calculated by the two-link model. The unbillable load $U_{BC}$ is $$U_{UBC} = a' - U_{BC}$$

Once the busy month busy hour total offered load, including reattempts, a', has been verified, the outputs of the two-link retrial model may be used in conjunction with the ECON method and model of the invention to determine various offered loads which will be offered to the telephone network over various time frames. Such a determination will be useful in determining network circuit needs together with the various expense and revenue figures associated with those needs (steps 36 and 38), so that the model can accurately serve as a guide for cost-efficient engineering improvements. This portion of the model and method is depicted by FIG. 2, steps 31A and 31B, for both the outgoing telephone traffic loads and incoming telephone traffic loads, respectively.

By employing the ECON model and method and particularly the two-link retrial model as previously described, the billable carried load may be calculated hourly for a typical Average Business Day (ABD), utilizing the "busy-month-busy-hour" offered load for a particular special country and year as used by the PSI system. Therefore, for a typical month (m) and typical ABD hour (h), the first attempt offered load may be calculated, as follows:

$$a_{mh} = \text{busy month-busy hour offered load} \times POPFRC_{mh}$$

where $POPFRC_{mh}$=The Peak-Off-Peak fraction of the Busy-Month-Busy-Hour Load

Typical peak-off-peak (POP) load profiles are shown in FIGS. 11–13. The POP load profiles are a compilation of the total day offered calling loads for a given month and illustrate the percent of the total day offered load for each hour during the days of a given month. The "busy month-busy hour" load for this set of POP charts is illustrated in FIG. 11 as the 12th month (December having the heaviest daily call load) at the eighth hour (from 8:00 a.m. to 9:00 a.m. having the largest percentage of the total traffic load for a given average business day in December). POP load profiles are well-known to those skilled in the art and are normally kept or otherwise prepared by interexchange carriers from actual (measured) load information.

By employing, for example, three POP load profiles covering the Average Business Day (FIG. 11), a first weekend day (FIG. 12) and second weekend day (FIG. 13), the estimated weekend/weekday traffic ratio (R) may be readily approximated. Referring to FIGS. 11–13, the sum of the total day offered loads for the weekend days of the twelve months of the year may be summed and divided by two to derive an average daily offered load for a weekend day. Next, this figure may be divided into the sum of the total day offered loads for the average business day (FIG. 11) for each of the twelve months of the year; the calculated ratio represents the weekend/weekday traffic ratio. Once the weekend/weekday traffic ratio has been calculated, hourly and monthly load profiles (POPFRC$_{mh}$) may be calculated from the various POP reports. POPFRC$_{mh}$ for a given hour of a given month is found by dividing the product resulting from a subject hourly load multiplied by the total day offered load for a given month, into the product resulting from the percent busy hour load for the busy month total daily load. For example, to derive the POPFRC$_{mn}$ for the 6th hour of January for an average busy day (see FIG. 11), one would divide the product of 3% (the percent hourly load for 6th hour of a business day in January)×269938 (total day offered load for a business day in January) into the product of busy month-busy hour load (which is the 8th hour December, 6.4%) multiplied by the total day offered load for the busy month (355032).

To accurately forecast needs according to the method and model of the invention, the maximum load during the specified busy-month in the POP reports (for example, hour 8 of December for the average business day) is made to correspond to the actual busy-month-busy-hour actual load that has been forecast by interexchange carriers for the given years. In this manner, the Peak-Off-Peak fraction of the Busy-Month-Busy-Hour-Load (POPFRC$_{mh}$) that will be offered to the international network for a given year for every hour of the Average Business-Day (ABD) for each month can be calculated. Thus, the POP load profiles may be used to calculate the economics of a 24 hour period.

Owing to uncertainty of the exact origin of calls placed within the U.S., the method and model according to the invention assumes that the traffic leaving the U.S. from a particular ISC originated in the area of that ISC. One may then apply a tariff structure based on a single time zone (CST).

Applying the data from the load profiles and the calculated values obtained from the two-link model, therefore, a yearly total Offered Load including reattempts[1], A$_{min}$, may be calculated as

[1]It is convenient to regard a typical month as having 30.42 days (365/12) including 21.73 weekdays and 8.69 weekend days (i.e., Saturdays plus Sundays). Therefore, MD=21.73+8.69*R where R=(average non-weekday traffic)/(average weekday traffic).

$$A_{min} = 60 \times \left( \sum_{m=1}^{12} \sum_{h=0}^{23} a'_{mh} \right) \times MD$$

where MD=Month/Day Ratio=21.73+8.69×R, $$R = \frac{\text{AV. non-weekday traffic}}{\text{Av. weekday traffic}}$$

and
a'$_{mh}$ is calculated from the two-link model utilizing an appropriate value of a$_{mh}$ as derived from the POP charts. The yearly Total Billable Minutes, BU$_{min}$, may thus be calculated as:

$$BU_{min} = 60 \times \left( \sum_{m=1}^{12} \sum_{h=0}^{23} U_{BC,mh} \right) \times MD$$

and the yearly Unbillable Call Minutes, UBU$_{min}$, may be calculated as $$UBU_{min} = 60 \times \left( \sum_{m=1}^{12} \sum_{h=0}^{23} (a'_{mh} - U_{BC,mh}) \right) \times MD$$

The Number of Billable Calls, N may be calculated as $$N = \frac{BU_{min}}{HDT_{conversation}}$$

where HDT$_{conversation}$=Average Conversation Time.
The Number of Seizure Calls, S, can thus be calculated as $$S = \frac{N}{ASR}$$

The number of total call attempts, including reattempts (R) can thus be found by $$R = \frac{S}{1 - B_{intl}} = \frac{N}{(1 - B_{intl}) \times ASR} = \frac{N}{1 - B_{end\text{-}to\text{-}end}}$$

The number of unbillable calls, I, is equated as follows:

$$I = R - N$$

While the number of first attempts, F, equals $$F = R \times (1 - B_{end\text{-}to\text{-}end} \times P_r) = \frac{N \times (1 - B_{end\text{-}to\text{-}end} \times P_r)}{1 - B_{end\text{-}to\text{-}end}}$$

The blocking due to the unavailability of occupied circuits in the international link (NC) may be approximated by 1−S/R, and the end-to-end international call blocking is derived as B$_{end\text{-}to\text{-}end}$=I/R. The above calculations are applied to both outgoing and incoming traffic (Steps 31A and 31B, FIG. 2) by using corresponding ASR.

As those skilled in the art will appreciate, the above analysis can be used to assess the load effects rendered by changes in the system network, such as changes in trunk capacity or ASR. For instance, if the international trunks between the interexchange network carrier's and the foreign carrier's ISCs are increased by ΔT, the above analysis can be repeated with T+ΔT trunks to find:
Additional Billable Calls, $$\Delta N(T) = N(T + \Delta T) - N(T)$$

Additional Ineffective Call Attempts, $$\Delta I(T) = I(T + \Delta T) - I(T)$$

Similarly, if the foreign carrier internal network call completion rate (ASR) is improved by ΔASR, then the method will determine
Additional Billable Calls, $$\Delta N(ASR) = N(ASR + \Delta ASR) - N(ASR)$$

Additional Ineffective Call Attempts, $$\Delta I(ASR) = I(ASR + \Delta ASR) - I(ASR)$$

As will be appreciated, the ECON method and model according to the invention can be applied to any situation with one or multiple input parameters are changed (e.g., the foreign network ASR improved and international circuits increased at the same time). Thus Additional Billable Calls, $$\Delta N(ASR,T) = N(ASR+\Delta ASR, T+\Delta T) - N(ASR,T)$$ and Additional Ineffective Call Attempts $$\Delta I(ASR,T) = I(ASR+\Delta ASR, T+\Delta T) - I(ASR,T)$$

The method and model thus provides a ready way to determine the effects of circuit and ASR improvements on load variances and, hence, will provide a way (in conjunction with a revenue and expense model to be shortly described) to assess the economic impact of same.

For different types of phone calls, an interexchange carrier will typically assess charges to customers based upon differing tariff rates. Thus, for the purposes of the ECON method and model according to the invention, calls should be distinguished by type of call category. Correspondent tariffs then can be applied to correspondent traffic. For example, in the case of the tariff structures currently implemented by AT&T, each country's transit, USADirect, and Reach Out World (ROW) traffic may be gathered from established databases with an estimated growth rate. Corresponding POP load profiles can, thus, be generated with assumptions as to load traffic as will be known or readily derived by an affected interexchange carrier knowledgeable with his previous load profiles.

With all those load profiles (for example, regular call, OPH, ROW, USAD, and transit), yearly ROW, USAD, transit, and total traffic, and individual type hourly traffic can be identified. For example, in any typical hour, the OPH traffic will be equivalent to the percentage of OPH calls times total normal call traffic.

It would be apparent that other and further forms of load analysis and derivations can be realized utilizing the information generated by the method and model according to the invention.

Referring to FIG. 2, Step 34 is a diagrammatic representation of the calculation of a revenue and expense model utilized for the ECON method of the invention. After estimates have been made for the number of different types of phone calls and for loads of same (for example, the IDDD, OPH, ROW, USAD, transit services described above), correspondent tariffs can then be applied to correspondent traffic to arrive at revenue and expense figures.

The quantified elements of the ECON analysis according to the invention in adding international trunks or implementing improvement to foreign internal network call completion rates will include:
1. Fulfilled Demand
2. Unfulfilled Demand
3. Tariffs
4. Settlement Rates
5. Access Charges
6. Billing Charges
7. Network Utilization Costs
8. Operator Assistance Costs
9. Retrial Behavior
10. Proportional Returns
11. Uncollectibles
12. Capital Costs Steps 36 and 38, respectively, on FIG. 2 are diagrammatic representations of the outgoing (step 36) and incoming (step 38) revenue and expense approximations of the revenue and expense model (34) for the ECON method according to the invention. These steps, in conjunction with the analysis as to variances in the numbers of billable calls, ineffective call attempts and the like, will assist the interexchange carrier to assess the economic ramifications of changes to trunk capacity or to improvements in call ASR implemented in foreign country domestic telephone networks.

For outgoing call approximations (step 36), revenues will be generated from certain of the call services provided by interexchange carriers. For example, for AT&T, revenues will be generated by International Direct Distance Dial calls; International Operator Assisted calls; Reach Out World; USADirect; and transit traffic. Those skilled in the art will appreciate that the method and analysis of the ECON method according to the invention is not limited to any one tariff rate structure and can be applied to any tariff rate structure offered by various interexchange carriers.

For outgoing calls, expense approximations (FIG. 2, step 36) include, for example, settlement expenses, the access charge, billing charge, international exchange carrier's network utilization cost, and operator assistance cost.

1. The outgoing settlement fee will be equal to the annual outgoing minutes×accounting rate/2.
2. Access charge—for each international call, whether the call is completed or not, the interexchange carrier will have to pay the RBOC certain access fees, which, as described before, will be known to the affected interexchange carrier.
3. Billing charge—for each international completed call, the interexchange carrier has to pay the RBOC a certain billing charge, which, as described before, will be known to the affected interexchange carrier.
4. Network utilization expense—for each international call, whether the call is completed or not, there is a network utilization expense associated with the call, which, as described before, will be known to the affected interexchange carrier.
5. Operator-assisted cost—this number is estimated by dividing the total interexchange carrier operator expense by the total number of call attempts, which as described before, will be known to the affected interexchange carrier.

Step 40 (FIG. 2) factors in the effects of proportional return to the interexchange carrier in assessing the economic impact of engineering devices for the system. For example, as more international circuits are added to the network, the completed calls in the international network, should increase. Therefore, the foreign telecommunications administrator should return a proportional flow of call traffic back to the U.S. through the network of the interexchange carrier. The ECON method according to the invention has factored in the return flow and treats the effect of the proportional return as follows:

(1) At the current level of trunks, T, the method and model will calculate
   (a) the outbound carried minutes, OCM(T); and
   (b) the inbound carried minutes, ICM(T), which are equal to $BU_{min}$ in and out, respectively;
   (c) the outbound revenue-expense, ORE(T), and
   (d) the inbound revenue-expense, IRE(T), which are both calculated from the revenue and expense model; and
   (e) the net profit PROFIT(T)=ORE(T)+IRE(T)

(2) Then assuming $\Delta T$ trunks are added, the method and model will calculate
   (a) the outbound carried minutes, OCM(T+$\Delta T$),
   (b) the inbound carried minutes, ICM(T+$\Delta T$),
   (c) the outbound revenue-expense, ORE(T+$\Delta T$), (d) the inbound revenue-expense, IRE $(T+\Delta T)$, (e) the net profit PROFIT $(T+\Delta T)=\text{ORE}(T+\Delta T)+\text{IRE}(T+\Delta T)$ (3) From PSI, the inbound traffic percentage $R_{in}$ can be approximated, so that the outbound traffic percentage, $R_{out}$ will=$100-R_{in}$;

(4) The inbound minutes, $\Delta M$, can be adjusted due to the proportional return effect, as follows $$\Delta M = (OCM(T+\Delta T) - OCM(T)) \times \frac{Rin}{Rout} - (ICM(T+\Delta T) - ICM(T))$$

(5) So that the profit realized by the interexchange carrier can be adjusted for proportional return as $$\frac{IRE(T)}{ICM(T)} \times \Delta M$$

to result in a netprofit = $\text{PROFIT}(T+\Delta T) + \Delta M \times \frac{IRE(T)}{ICM(T)}$ Step 42 (FIG. 2) factors in the effects of uncollectible revenue into the ECON method. According to the Communications Fraud Control Association, long-distance calling fraud is a problem that, nationwide, costs telephone companies more than $1 billion annually. Theft of services today is mushrooming and much of the toll fraud occurring today is international in nature. Therefore, it is important to consider fraud when MOI is estimated. Since
MOI=REVENUES-SETTLEMENT-EXPENSES-COSTS-UNCOLLECTIBLE LOSS
and
UNCOLLECTIBLE LOSS=REVENUES×% UNCOLLECTIBLES,
NET MOI=REVENUES×(1-% UNCOLLECTIBLES)-SETTLEMENT-EXPENSES-COSTS For the ECON model, the percentage of uncollectibles may be gathered from the records compiled or otherwise calculated by various interexchange carriers.

Step 38 (FIG. 2) is illustrative of incoming revenues and expenses which are weighed into the ECON model according to the invention. For incoming calls, revenues are typically generated from settlement fees and transit traffic, and these revenues will be known and readily calculated by the affected interexchange carrier.

For incoming traffic (Step 38), expenses include the access charge, network utilization cost of the interexchange carrier, and operator assistance cost. The calculations are identical to those described in the outgoing settlement section as described above.

The amount of "payoff" the interexchange carrier will realize on outgoing completed calls will equal:

PAYOFF=the amount of money collected from the customer,
the settlement agreement with the foreign partner,
an access charge paid to the local operating company,
the billing charge paid to the local operating company,
interexchange carrier network utilization costs,
operator work time costs multiplied by the proportion of completed calls that are operator handled,
Uncollectibles (e.g., loses due to fraud).

While the model will be able to estimate the total incoming minutes, the data is uncertain for tariffs and expenses associated with the foreign telecommunications administrator. Thus, the ECON method and model according to the invention will account the telecommunication administrator share utilizing settlement fee information with respect to the interexchange carrier.

TA's SHARE=the settlement received from interexchange carrier–the settlement paid out to interexchange carrier.

When either international circuits are added or a foreign network ASR is improved, there may be an additional payment to the interexchange carrier on the settlement fee due to the carrying of additional outgoing calls and gains on the settlement fee due to carrying of additional incoming calls, so that the Net Settlement Fee will be adjusted as =

(additional outgoing – incoming min.) × the accounting rate × 0.5

For ineffective call attempts, not only is no revenue generated, but there will be associated expenses. By reducing the number of ineffective attempts, it is possible to achieve a total reduction in cost penalty (CR), represented by the formula $$CR=Q\times\Delta I$$

where
Q=the access charge paid to the local operating company
+ interexchange carrier network utilization costs
+ operator work time costs
Multiplied by the proportion of ineffective attempts (I) handled by the operator.

Referring again to FIG. 2, step 44 is representative of a cost model portion for the ECON method of the invention. For example, major capital costs will include equipment costs for circuits, multiplexers, switches and the like. Circuit costs utilized in the method and model according to the invention may include, for example, yearly fiber costs per circuit or yearly satellite circuit costs and these will be known to the affected interexchange carrier. Likewise, yearly multiplexer and switch costs will also be known or readily estimated by the affected interexchange carrier based on their actual costs. The ECON method and model takes into account the above costs. By automatically including a facility charge for a new circuit, the ECON method most likely underestimates the benefit of adding facilities. Since one of the major objectives of the method is to decide whether or not to activate circuits, the decision recommended by the model will be conservative; future cost data as well became known may be cheaper than the satellite rental cost utilized in the model, and such new cost data can be employed in the analysis.

Referring to FIG. 2, steps 46(a)–46(d) diagrammatically represent a series of outputs which may result from applying the ECON method according to the invention to determine worth in international call completion. For example, the output of the ECON method may include:

1. Either by region or by country, a sorted view of the most profitable countries in terms of adding a single circuit (trunk). Graphs depicting the addition of all possible profitable circuits can also be generated.

2. The same as above (1) except that the view is by revenue and ASR improvement.

3. Detailed information on the above listing each expenses and revenue component, as well as estimates of additional revenues for the foreign correspondent.

4. Determine the number of circuits required to achieve economic blocking levels (economic grades of service) for to a particular country.

Other outputs are available depending upon user desire or need.

Operation of ECON Method

An example of application of the ECON method and model for a typical interexchange carrier, utilizing data available to a typical interexchange carrier is provided. For illustrative purposes, the following shows the results obtained by the method and model for a typical interexchange carrier in analysis directed towards a certain Country "A" and a certain Country "B", utilizing country data available, for example, from AT&T's IMCDB billing database and IOD forecasting records. Of course, it will be understood and appreciated that other databases and data as available to interexchange carriers can be utilized to exhibit the benefits realized by those interexchange carriers utilizing the method and model of the invention and to verify the output of the method model, and that output for country data available from an AT&T database is provided solely for illustrative purposes to better illustrate operation of the method and model. One skilled in the art will also appreciate that other outputs are possible based on user need, desire, information availability, or the like.

To assess the validity of the model's outputs, the past three years data for a certain Country "A" and Country "B" have been assembled. A three-year study (1990, 1991 and 1992) was conducted and the results are shown in Tables 1–4.

Table-1 shows the results of the model's predictions for Country A during the period from January, 1991 to June, 1991. For convenience, the time frame of Country A for January–June, 1991 was chosen to compare the model's prediction with the actual data, because complete measured data for attempts, seizures and completed call are available for this period, and during this period, the number of international circuits between the international carrier and Country A were constant. The model's prediction results are within 4% of the actual measured data from the available billing database.

The results are within 3% and 13% respectively of the actual measured data from the billing database.

TABLE 1

COUNTRY A: Jan.–Jun. 91, Output Validity

|  | NUMBER OF ATTEMPTS | NC % | NUMBER OF SEIZURES | ASR % | NUMBER OF BILLABLE CALLS | NUMBER OF UNBILLABLE CALLS | END-TO-END COMPLETION RATE(%) |
|---|---|---|---|---|---|---|---|
| | | | ORIGINATING IN THE UNITED STATES | | | | |
| MEASURED | 38,736,390 | 51.5 | 18,787,150 | 15.1 | 2,846,099 | 35,930,268 | 7.3 |
| MODEL | 37,453,951 | 49.8 | 18,817,777 | 15.1 | 2,841,484 | 34,612,467 | 7.6 |
| | | | TERMINATING IN THE UNITED STATES | | | | |
| MEASURED | 957,233 | 51.5 | 464,258 | 62.5 | 290,120 | 668,101 | 30.3 |
| MODEL | 920,692 | 49.8 | 464,578 | 62.5 | 289,111 | 631,580 | 31.4 |

Tables-2 and 3 show the results of the model's prediction for Country A and Country B respectively from 1990 to 1992.

TABLE 2

Country A: 1990–1992, Output Validity

| YEAR | NUMBER OF ATTEMPTS | NC % | NUMBER OF SEIZURES | ASR % | NUMBER OF BILLABLE CALLS | NUMBER OF UNBILLABLE CALLS | END-TO-END COMPLETION RATE(%) |
|---|---|---|---|---|---|---|---|
| | | | ORIGINATING IN THE UNITED STATES | | | | |

TABLE 2-continued

Country A: 1990–1992, Output Validity

|  | YEAR | NUMBER OF ATTEMPTS | NC % | NUMBER OF SEIZURES | ASR % | NUMBER OF BILLABLE CALLS | NUMBER OF UNBILLABLE CALLS | END-TO-END COMPLETION RATE(%) |
|---|---|---|---|---|---|---|---|---|
| MEASURED | 1990 |  |  | 30,908,480 | 16.5 | 5,111,587 |  |  |
| MODEL | 1990 | 55,912,445 | 45.6 | 30,393,845 | 16.5 | 5,014,984 | 50,897,461 | 9.0 |
| MEASURED | 1991 | 46,800,000 | 27.4 | 33,999,571 | 16.2 | 5,522,778 |  |  |
| MODEL | 1991 | 47,068,327 | 27.4 | 34,178,540 | 16.2 | 5,536,923 | 41,531,404 | 11.8 |
| MEASURED | 1992 | 21,800,000 |  |  |  |  |  |  |
| MODEL | 1992 | 21,653,720 | 5.5 | 20,473,120 | 31.0 | 6,346,667 | 15,307,053 | 29.3 |
| | | | TERMINATING IN THE UNITED STATES | | | | | |
| MEASURED | 1990 |  |  | 756,736 | 60.9 | 461,109 |  |  |
| MODEL | 1990 | 1,393,899 | 45.6 | 757,720 | 60.9 | 461,451 | 932,448 | 33.1 |
| MEASURED | 1991 | 2,646,200 | 27.4 | 1,922,424 | 64.1 | 1,232,239 |  |  |
| MODEL | 1991 | 2,729,360 | 27.4 | 1,981,917 | 64.1 | 1,270,409 | 1,458,951 | 46.5 |
| MEASURED | 1992 |  |  |  |  |  |  |  |
| MODEL | 1992 | 3,911,387 | 5.5 | 3,698,131 | 71.2 | 2,633,069 | 1,278,381 | 67.3 |

TABLE 3

Country B: 1990–1992, Output Validity

|  | YEAR | NUMBER OF ATTEMPTS | NC % | NUMBER OF SEIZURES | ASR % | NUMBER OF BILLABLE CALLS | NUMBER OF UNBILLABLE CALLS | END-TO-END COMPLETION RATE(%) |
|---|---|---|---|---|---|---|---|---|
| | | | ORIGINATING IN THE UNITED STATES | | | | | |
| MEASURED | 1990 |  |  |  | 53.0 | 6,946,851 |  |  |
| MODEL | 1990 | 12,893,619 | 1.0 | 12,768,267 | 53.0 | 6,767,182 | 6,126,437 | 52.5 |
| MEASURED | 1991 |  |  | 16,706,188 | 53.4 | 8,914,237 |  |  |
| MODEL | 1991 | 16,926,960 | 2.6 | 16,482,769 | 53.4 | 8,801,799 | 8,125,161 | 52.0 |
| MEASURED | 1992 | 17,600,000 |  |  |  |  |  |  |
| MODEL | 1992 | 18,141,764 | 0.1 | 18,121,046 | 59.2 | 10,727,659 | 7,414,105 | 59.1 |
| | | | TERMINATING IN THE UNITED STATES | | | | | |
| MEASURED | 1990 |  |  |  | 67.6 | 7,665,727 |  |  |
| MODEL | 1990 | 11,404,365 | 1.0 | 11,293,492 | 67.6 | 7,634,401 | 3,769,965 | 66.9 |
| MEASURED | 1991 |  |  | 14,448,875 | 69.8 | 10,078,800 |  |  |
| MODEL | 1991 | 14,071,148 | 2.6 | 13,701,899 | 69.8 | 9,563,925 | 4,507,223 | 68.0 |
| MEASURED | 1992 |  |  |  |  |  |  |  |
| MODEL | 1992 | 15,856,288 | 0.1 | 15,838,180 | 76.9 | 12,179,560 | 3,676,728 | 76.8 |

Table-4 shows the results of the model's predictions for billed accounting minutes for Country A and Country B from 1990 to 1992. The ECON method and model's prediction results have been compared with available billing data for annual accounting minutes. The model's prediction is within 3% and 5%, respectively, of the actual measured data from the billing database.

TABLE 4

The Results of the Model's Prediction for Country A and Country B from 1990 to 1992

| | | AT & T BILLED ACCOUNTING MINUTES | | TA BILLED ACCOUNTING MINUTES | |
|---|---|---|---|---|---|
| COUNTRY | YEAR | MODEL PREDICTED | IMCDB BILLING DATA | MODEL PREDICTED | IMCDB BILLING DATA |
| Country A | 1990 | 57,656,273 |  | 2,843,924 |  |
| Country A | 1991 | 63,656,901 | 63,494,178 | 7,829,530 | 7,594,301 |
| Country A | 1992 | 72,966,364 |  | 16,227,605 |  |
| Country B | 1990 | 42,901,225 | 46,561,445 | 36,371,813 | 35,654,119 |
| Country B | 1991 | 55,799,884 | 56,512,848 | 45,564,452 | 48,017,097 |
| Country B | 1992 | 68,009,067 |  | 58,025,862 |  |

Table-5 shows for purposes of illustration, the AT&T and the telecommunications administrator revenue shares of the model's prediction for Country A and Country B, respectively, from 1990 to 1992.

TABLE 5

AT & T's and TA's shares of the model's predictions for Country A and Country B 1990 to 1992.

| COUNTRY | YEAR | AT & T'S REVENUE | ORIGINATING IN THE UNITED STATES | | TERMINATION IN THE UNITED STATES PAYOUT TO AT & T'S SETTLEMENT FEE | ALL | |
| --- | --- | --- | --- | --- | --- | --- | --- |
| | | | PAYOUT TO TA SETTLEMENT FEE | AT & T'S NET REVENUE | | AT & T'S SHARE | TA'S SHARE |
| Country A | 1990 | 61,782,210 | 42,048,446 | 19,733,767 | 1,877,480 | 21,611,248 | 40,170,965 |
| Country A | 1991 | 67,843,470 | 46,548,917 | 21,294,556 | 5,616,685 | 26,911,241 | 40,932,232 |
| Country A | 1992 | 77,815,729 | 53,531,014 | 24,284,715 | 11,915,241 | 36,199,956 | 41,615,773 |
| Country B | 1990 | 46,857,389 | 36,022,843 | 10,834,546 | 29,259,420 | 40,093,966 | 6,763,423 |
| Country B | 1991 | 60,291,373 | 46,530,558 | 14,760,815 | 36,742,501 | 51,503,316 | 9,788,057 |
| Country B | 1992 | 74,212,205 | 56,595,257 | 17,616,948 | 47,001,796 | 64,618,744 | 9,593,461 |

Figure 5:
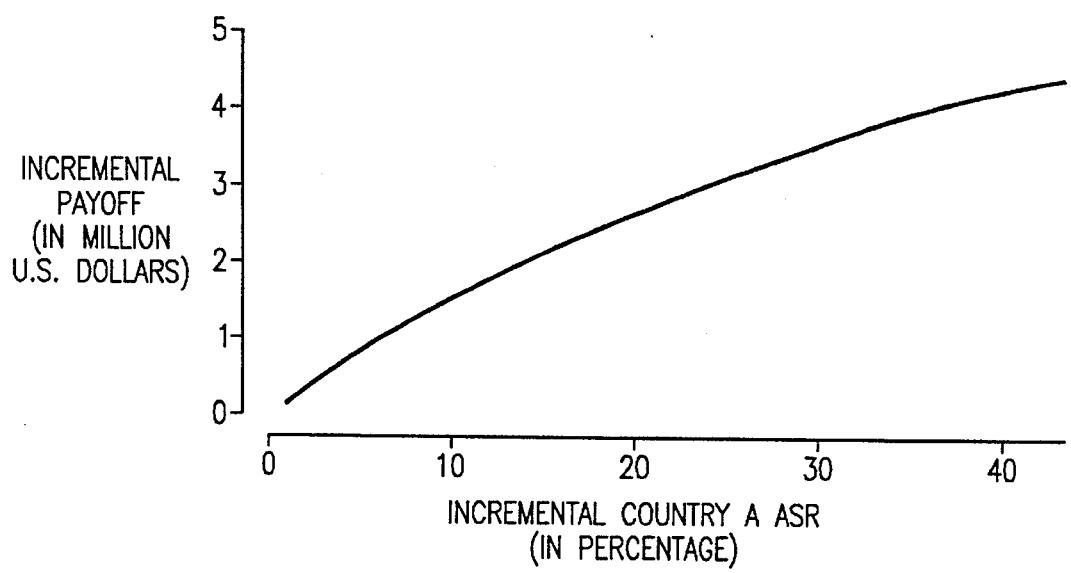
FIG. 5 is a diagrammatic chart of the impact of ASR improvement for a Country "A" on incremental annual payoff for a typical interexchange telephone carrier such as AT&T utilizing the method and model according to the invention.
Figure 6:
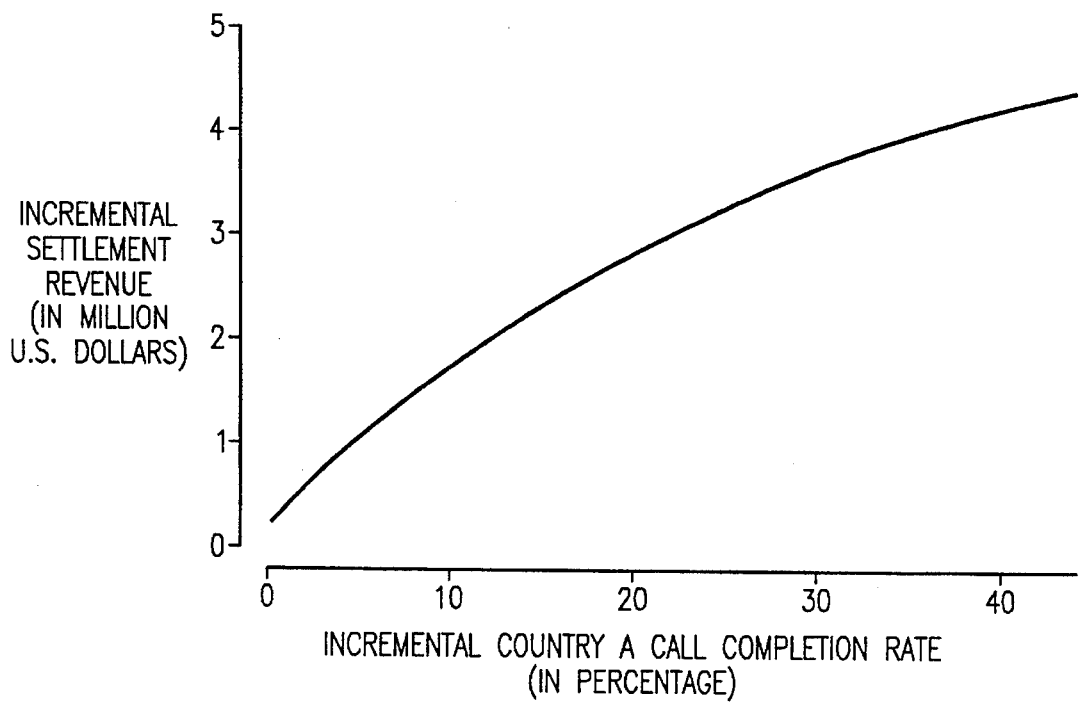
FIG. 6 is a diagrammatic chart of the impact of ASR improvement for Country A on incremental annual Country A settlement revenue received from a typical interexchange telephone carrier such as AT&T utilizing the method and model according to the invention.

Referring to Table-6 and to FIGS. 5 and 6, for purposes of illustration, the incremental AT&T payoff and incremental TA settlement fee paid by AT&T vs. Country A's ASR improvement is shown. AT&T payoff includes cost of additional settlement, billing charges, access fees, network utilization costs, operator expenses, and uncollectibles. It does not include any capital expense in the U.S. and the foreign country. The curves show that the more the ASR is improved, the higher the payoff AT&T gains and the higher the settlement fee TA receives from AT&T.

TABLE 6

The Incremental AT & T Payoff and Incremental TA Settlement
Fee Paid by AT & T vs Country A's ASR improvement

| Δ ASR | ADD MIN out | ADD MIN in | ADD MIN total | ADD REV total | ADD SETTLEMENT FEE out | ADD SETTLEMENT FEE in | ADD SETTLEMENT FEE total | ADD ACCESS FEE out | ADD ACCESS FEE in | ADD ACCESS FEE total | ADD BILLING EXP. total | ADD NTWK EXP. out | ADD NTWK EXP. in | ADD NTWK EXP. total | ADD OP-WK EXP. total | SAVING (w/o PR) (w/o FD) total | UNCOLLECTIVE LOSS total | SAVING total |
|---|---|---|---|---|---|---|---|---|---|---|---|---|---|---|---|---|---|---|
| 0.01 | 291K | 11K | 302K | 312K | -218K | 9K | -209K | 42K | -1K | 41K | -6K | 18K | -0K | 18K | -0K | 156K | -11K | 179K |
| 0.02 | 568K | 22K | 590K | 609K | -426K | 17K | -409K | 84K | -1K | 82K | -12K | 36K | -0K | 36K | -0K | 306K | -22K | 351K |
| 0.03 | 832K | 33K | 865K | 893K | -624K | 25K | -599K | 124K | -2K | 122K | -17K | 53K | -0K | 53K | -1K | 451K | -32K | 517K |
| 0.04 | 1084K | 44K | 1128K | 1163K | -813K | 33K | -780K | 165K | -3K | 162K | -23K | 71K | -1K | 70K | -1K | 592K | -42K | 677K |
| 0.05 | 1325K | 54K | 1379K | 1422K | -993K | 41K | -953K | 204K | -4K | 201K | -28K | 88K | -1K | 87K | -1K | 728K | -51K | 832K |
| 0.06 | 1555K | 65K | 1620K | 1669K | -1166K | 48K | -1118K | 243K | -4K | 239K | -33K | 104K | -1K | 103K | -1K | 859K | -60K | 982K |
| 0.07 | 1776K | 74K | 1851K | 1906K | -1332K | 56K | -1276K | 281K | -5K | 276K | -37K | 121K | -1K | 120K | -1K | 987K | -68K | 1126K |
| 0.08 | 1988K | 84K | 2072K | 2133K | -1491K | 63K | -1428K | 319K | -5K | 314K | -42K | 137K | -1K | 136K | -1K | 1111K | -77K | 1267K |
| 0.09 | 2191K | 94K | 2285K | 2351K | -1643K | 70K | -1573K | 356K | -6K | 350K | -46K | 153K | -1K | 151K | -2K | 1232K | -84K | 1402K |
| 0.10 | 2386K | 103K | 2489K | 2560K | -1790K | 77K | -1712K | 393K | -7K | 386K | -50K | 169K | -2K | 167K | -2K | 1348K | -92K | 1534K |
| 0.11 | 2574K | 112K | 2685K | 2761K | -1930K | 84K | -1846K | 429K | -7K | 422K | -54K | 184K | -2K | 182K | -2K | 1462K | -99K | 1662K |
| 0.12 | 2754K | 121K | 2875K | 2954K | -2066K | 90K | -1975K | 464K | -8K | 456K | -58K | 199K | -2K | 197K | -2K | 1573K | -106K | 1786K |
| 0.13 | 2928K | 129K | 3057K | 3140K | -2196K | 97K | -2099K | 499K | -8K | 491K | -61K | 214K | -2K | 212K | -2K | 1680K | -113K | 1907K |
| 0.14 | 3096K | 138K | 3233K | 3320K | -2322K | 103K | -2218K | 534K | -9K | 525K | -65K | 229K | -2K | 227K | -2K | 1786K | -119K | 2024K |
| 0.15 | 3257K | 146K | 3403K | 3493K | -2443K | 109K | -2334K | 568K | -9K | 558K | -68K | 244K | -2K | 241K | -2K | 1888K | -125K | 2139K |
| 0.16 | 3414K | 154K | 3567K | 3660K | -2560K | 115K | -2445K | 601K | -10K | 591K | -72K | 258K | -2K | 256K | -2K | 1988K | -131K | 2250K |
| 0.17 | 3564K | 162K | 3726K | 3821K | -2673K | 121K | -2552K | 634K | -11K | 623K | -75K | 272K | -2K | 270K | -2K | 2085K | -137K | 2358K |
| 0.18 | 3710K | 169K | 3879K | 3977K | -2782K | 127K | -2655K | 666K | -11K | 655K | -78K | 286K | -3K | 283K | -3K | 2180K | -143K | 2464K |
| 0.19 | 3851K | 177K | 4028K | 4128K | -2888K | 133K | -2756K | 698K | -12K | 687K | -81K | 300K | -3K | 297K | -3K | 2273K | -148K | 2567K |
| 0.20 | 3988K | 184K | 4172K | 4274K | -2991K | 138K | -2852K | 730K | -12K | 718K | -84K | 313K | -3K | 310K | -3K | 2364K | -153K | 2668K |
| 0.21 | 4120K | 192K | 4311K | 4416K | -3090K | 144K | -2946K | 761K | -12K | 748K | -87K | 326K | -3K | 324K | -3K | 2452K | -159K | 2766K |
| 0.22 | 4248K | 199K | 4446K | 4553K | -3186K | 149K | -3037K | 791K | -13K | 779K | -89K | 340K | -3K | 337K | -3K | 2539K | -163K | 2826K |
| 0.23 | 4372K | 205K | 4577K | 4685K | -3279K | 154K | -3125K | 822K | -13K | 808K | -92K | 353K | -3K | 349K | -3K | 2623K | -168K | 2955K |
| 0.24 | 4492K | 212K | 4704K | 4814K | -3369K | 159K | -3210K | 851K | -14K | 838K | -94K | 365K | -3K | 362K | -3K | 2706K | -173K | 3047K |
| 0.25 | 4608K | 219K | 4827K | 4938K | -3456K | 164K | -3229K | 881K | -14K | 866K | -97K | 378K | -3K | 375K | -3K | 2787K | -177K | 3136K |
| 0.26 | 4721K | 225K | 4947K | 5059K | -3541K | 169K | -3372K | 910K | -15K | 895K | -99K | 390K | -3K | 387K | -3K | 2866K | -182K | 3223K |
| 0.27 | 4831K | 231K | 5062K | 5176K | -3623K | 173K | -3450K | 938K | -15K | 923K | -101K | 402K | -3K | 399K | -3K | 2943K | -186K | 3308K |
| 0.28 | 4937K | 237K | 5175K | 5289K | -3703K | 178K | -3525K | 966K | -15K | 951K | -104K | 415K | -4K | 411K | -3K | 3019K | -190K | 3391K |
| 0.29 | 5040K | 243K | 5283K | 5399K | -3780K | 182K | -3598K | 994K | -16K | 978K | -106K | 426K | -4K | 423K | -3K | 3093K | -194K | 3473K |
| 0.30 | 5140K | 249K | 5389K | 5506K | -3855K | 187K | -3668K | 1021K | -16K | 1005K | -108K | 438K | -4K | 434K | -4K | 3165K | -198K | 3552K |
| 0.31 | 5237K | 255K | 5492K | 5610K | -3928K | 191K | -3737K | 1048K | -17K | 1031K | -110K | 450K | -4K | 446K | -4K | 3236K | -201K | 3630K |
| 0.32 | 5332K | 260K | 5592K | 5710K | -3999K | 195K | -3804K | 1075K | -17K | 1058K | -112K | 461K | -4K | 457K | -4K | 3305K | -205K | 3706K |
| 0.33 | 5424K | 265K | 5689K | 5808K | -4068K | 199K | -3869K | 1101K | -17K | 1083K | -114K | 472K | -4K | 468K | -4K | 3373K | -209K | 3781K |
| 0.34 | 5513K | 270K | 5783K | 5903K | -4135K | 203K | -3932K | 1127K | -18K | 1109K | -116K | 483K | -4K | 479K | -4K | 3440K | -212K | 3854K |
| 0.35 | 5600K | 275K | 5875K | 5996K | -4200K | 207K | -3993K | 1152K | -18K | 1134K | -118K | 494K | -4K | 490K | -4K | 3505K | -215K | 3925K |
| 0.36 | 5684K | 280K | 5964K | 6086K | -4263K | 210K | -4053K | 1177K | -18K | 1159K | -119K | 505K | -4K | 501K | -4K | 3570K | -218K | 3996K |
| 0.37 | 5766K | 285K | 6051K | 6174K | -4325K | 214K | -4111K | 1202K | -19K | 1183K | -121K | 516K | -4K | 510K | -4K | 3632K | -222K | 4064K |
| 0.38 | 5846K | 290K | 6136K | 6259K | -4385K | 217K | -4167K | 1226K | -19K | 1207K | -123K | 526K | -4K | 522K | -4K | 3694K | -225K | 4131K |
| 0.39 | 5924K | 294K | 6219K | 6324K | -443K | 221K | -4222K | 1250K | -19K | 1231K | -124K | 537K | -4K | 532K | -4K | 3754K | -228K | 4197K |
| 0.40 | 6000K | 299K | 6299K | 6423K | -4500 | 224K | -4276K | 1274K | -19K | 1255K | -126K | 547K | -4K | 542K | -4K | 3814K | -231K | 4262K |
| 0.41 | 6074K | 303K | 6377K | 6501K | -4556K | 227K | -4328K | 1298K | -20K | 1278K | -128K | 557K | -5K | 552K | -4K | 3872K | -233K | 4326K |

TABLE 6-continued

The Incremental AT & T Payoff and Incremental TA Settlement
Fee Paid by AT & T vs Country A's ASR improvement

| ASR | ADD MIN | | | ADD REV | ADD SETTLEMENT FEE | | | ADD ACCESS FEE | | | ADD BILL-ING EXP. | ADD NTWK EXP. | | | ADD OP-WK EXP. | SAVING (w/o PR) (w/o FD) | UNCOL-LECTIVE LOSS | SAVING |
|---|---|---|---|---|---|---|---|---|---|---|---|---|---|---|---|---|---|---|
| Δ | out | in | total | total | out | in | total | out | in | total | total | out | in | total | total | total | total | total |
| 0.42 | 6146K | 307K | 6453K | 6578K | −4610K | 230K | −4379K | 1321K | −20K | 1301K | −129K | 567K | −5K | 562K | −4K | 3929K | −236K | 4388K |
| 0.43 | 6216K | 311K | 6528K | 6653K | −4664K | 234K | −4429K | 1344K | −20K | 1324K | −131K | 577K | −5K | 572K | −4K | 3985K | −239K | 4449K |

Figure 7:
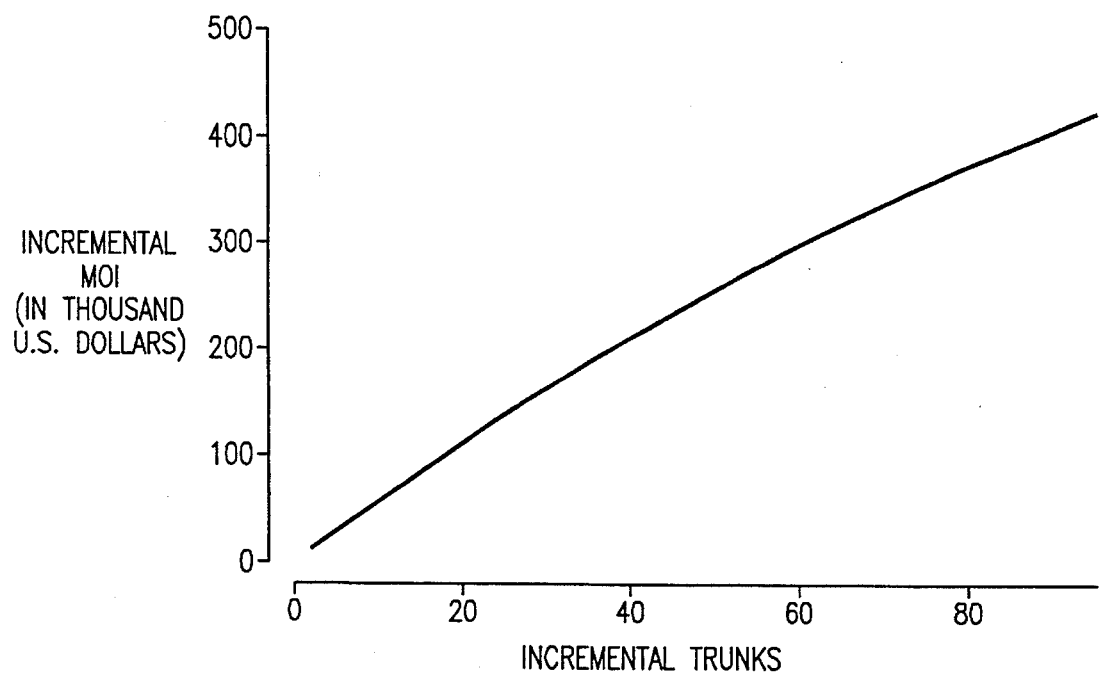
FIG. 7 is a diagrammatic chart of the impact of international trunk additions on incremental annual MOI for a typical interexchange telephone carrier such as AT&T utilizing the method and model according to the invention.
Figure 8:
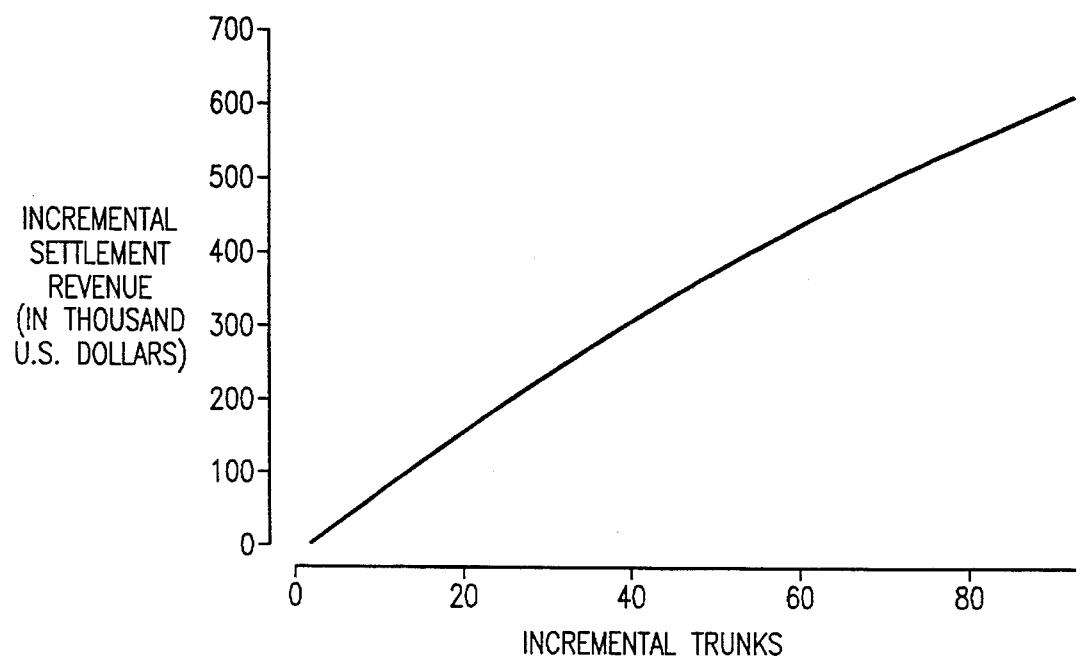
FIG. 8 is a diagrammatic chart of the impact of international trunk additions on incremental annual Country A settlement revenue for Country A from a typical interexchange telephone carrier such as AT&T utilizing the method and model according to the invention.

Referring to Table 7 and to FIGS. 7 and 8, for purposes of illustration the incremental AT&T MOI and incremental TA settlement fee paid by AT&T vs AT&T-Country A's international circuit (trunk) additions are shown. The curves show that initially, as more circuits are added, the more MOI that AT&T will gain and the higher the settlement fee that the TA will receive from AT&T. However, as shown, after 71 circuits are added, the incremental MOI on the last additional circuit becomes negligible. If circuits were to be added beyond this point, the 96th circuit (and beyond) would impart a negative impact on AT&T's MOI.

TABLE 7

The Incremental AT & T MOI and International TA Settlement Fee Paid by AT & T vs AT & T-Country A's International

| TRK | ADD MIN out | ADD MIN in | ADD MIN total | ADD REV total | ADD SETTLEMENT FEE out | ADD SETTLEMENT FEE in | ADD SETTLEMENT FEE total | ADD ACCESS FEE out | ADD ACCESS FEE in | ADD ACCESS FEE total | ADD BILLING EXP. total | ADD NTWK EXP. out | ADD NTWK EXP. in | ADD NTWK EXP. total | ADD OP-WK EXP. total | SAVING (w/o PR) (w/o FD) total | UNCOLLECTIVE LOSS total | SAVING (FD) (PR) total | MOI total |
|---|---|---|---|---|---|---|---|---|---|---|---|---|---|---|---|---|---|---|---|
| 1  | 15K   | 3K   | 18K   | 15K   | -11K  | 2K   | -9K   | 0K  | -0K  | 0K  | -0K  | 0K  | -0K | 0K  | -0K | 7K   | -1K  | 6K   | 3K   |
| 11 | 156K  | 35K  | 191K  | 160K  | -117K | 26K  | -91K  | 5K  | -2K  | 3K  | -3K  | 2K  | -1K | 2K  | -0K | 71K  | -6K  | 64K  | 29K  |
| 21 | 289K  | 64K  | 354K  | 297K  | -217K | 48K  | -169K | 10K | -4K  | 6K  | -6K  | 4K  | -1K | 3K  | -0K | 131K | -11K | 119K | 51K  |
| 31 | 413K  | 92K  | 505K  | 424K  | -310K | 69K  | -241K | 14K | -6K  | 8K  | -9K  | 6K  | -1K | 5K  | -0K | 187K | -15K | 170K | 70K  |
| 41 | 529K  | 118K | 647K  | 543K  | -397K | 88K  | -308K | 18K | -8K  | 10K | -11K | 8K  | -2K | 6K  | -0K | 239K | -19K | 218K | 86K  |
| 51 | 637K  | 142K | 778K  | 653K  | -478K | 106K | -371K | 21K | -9K  | 12K | -13K | 9K  | -2K | 7K  | -0K | 288K | -23K | 262K | 98K  |
| 61 | 737K  | 164K | 901K  | 757K  | -553K | 123K | -430K | 25K | -11K | 14K | -15K | 11K | -2K | 9K  | -1K | 333K | -27K | 304K | 107K |
| 71 | 831K  | 185K | 1016K | 853K  | -624K | 139K | -485K | 28K | -12K | 16K | -17K | 12K | -3K | 10K | -1K | 376K | -31K | 343K | 114K |
| 81 | 920K  | 205K | 1124K | 944K  | -690K | 153K | -536K | 31K | -13K | 18K | -19K | 14K | -3K | 11K | -1K | 416K | -34K | 380K | 118K |
| 82 | 928K  | 206K | 1135K | 953K  | -696K | 155K | -541K | 31K | -13K | 18K | -19K | 14K | -3K | 11K | -1K | 420K | -34K | 383K | 118K |
| 83 | 937K  | 208K | 1145K | 961K  | -703K | 156K | -546K | 32K | -14K | 18K | -20K | 14K | -3K | 11K | -1K | 424K | -35K | 387K | 119K |
| 84 | 945K  | 210K | 1155K | 970K  | -709K | 158K | -551K | 32K | -14K | 18K | -20K | 14K | -3K | 11K | -1K | 428K | -35K | 390K | 119K |
| 85 | 953K  | 212K | 1166K | 979K  | -715K | 159K | -556K | 32K | -14K | 18K | -20K | 14K | -3K | 11K | -1K | 431K | -35K | 394K | 119K |
| 86 | 962K  | 214K | 1176K | 987K  | -721K | 160K | -561K | 33K | -14K | 19K | -20K | 14K | -3K | 11K | -1K | 435K | -35K | 397K | 120K |
| 87 | 970K  | 216K | 1186K | 996K  | -728K | 162K | -566K | 33K | -14K | 19K | -20K | 15K | -3K | 11K | -1K | 439K | -36K | 400K | 120K |
| 88 | 978K  | 218K | 1196K | 1004K | -734K | 163K | -570K | 33K | -14K | 19K | -21K | 15K | -3K | 11K | -1K | 443K | -36K | 404K | 120K |
| 89 | 986K  | 219K | 1206K | 1012K | -740K | 165K | -575K | 33K | -14K | 19K | -21K | 15K | -3K | 11K | -1K | 446K | -36K | 407K | 120K |
| 90 | 994K  | 221K | 1216K | 1021K | -746K | 166K | -580K | 34K | -14K | 19K | -21K | 15K | -3K | 11K | -1K | 450K | -37K | 410K | 120K |
| 91 | 1002K | 223K | 1225K | 1029K | -752K | 167K | -585K | 34K | -14K | 19K | -21K | 15K | -3K | 12K | -1K | 454K | -37K | 414K | 120K |
| 92 | 1010K | 225K | 1235K | 1037K | -758K | 169K | -589K | 34K | -15K | 20K | -21K | 15K | -3K | 12K | -1K | 457K | -37K | 417K | 120K |
| 93 | 1018K | 226K | 1245K | 1045K | -764K | 170K | -594K | 34K | -15K | 20K | -21K | 15K | -3K | 12K | -1K | 461K | -38K | 420K | 120K |
| 94 | 1026K | 228K | 1254K | 1053K | -770K | 171K | -598K | 35K | -15K | 20K | -22K | 15K | -3K | 12K | -1K | 464K | -38K | 424K | 120K |
| 95 | 1034K | 230K | 1264K | 1061K | -775K | 172K | -603K | 35K | -15K | 20K | -22K | 15K | -3K | 12K | -1K | 468K | -38K | 427K | 120K |

A major objective of the ECON method is to guide interexchange carriers to determine whether or not to raise the facility capacity between the interexchange carrier and a correspondent foreign gateway. The basic assumption is that a producer should "provide" as long as the incremental MOI>0. Based on this criteria, the interexchange carrier can determine to what extent reducing the blocking level through circuit additions and/or ASR improvement will be profitable so as to establish a basic economic grade of service (EGOS).

Figure 9:
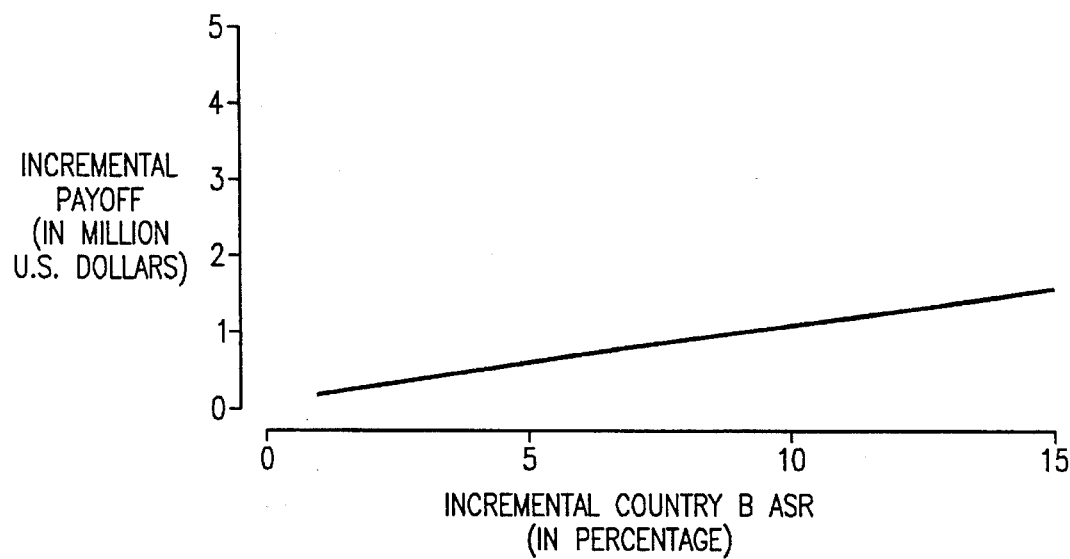
FIG. 9 is a diagrammatic chart of the impact of ASR improvement for a Country "B" on incremental annual MOI for a typical interexchange telephone carrier such as AT&T utilizing the method and model according to the invention.
Figure 10:
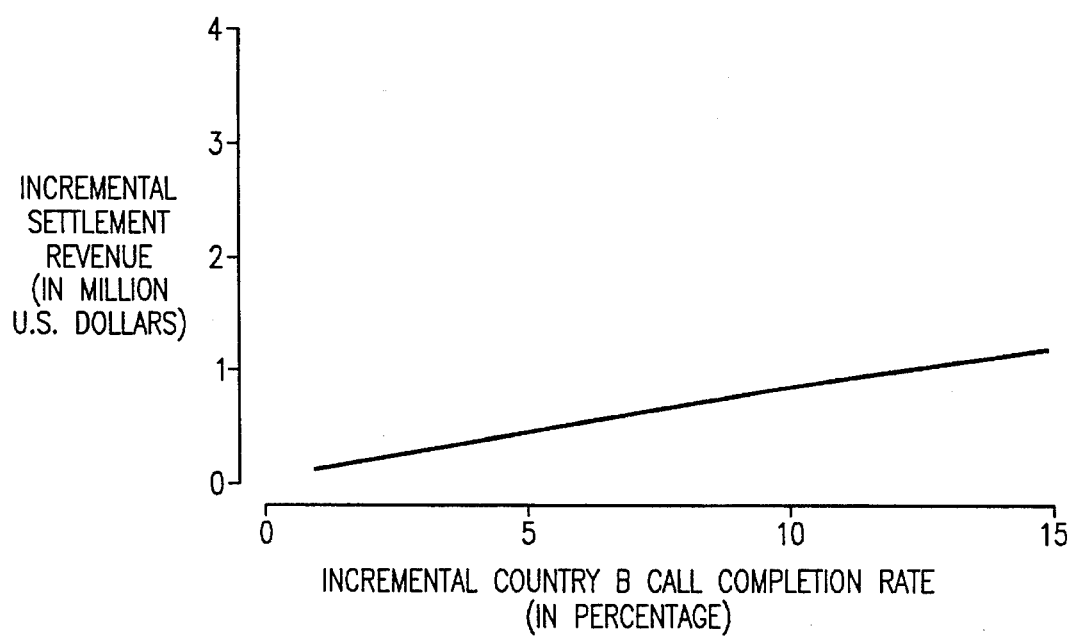
FIG. 10 is a diagrammatic chart of the impact of Country B ASR improvement on incremental annual Country B settlement revenue received from a typical interexchange carrier such as AT&T utilizing the method and model according to the invention.

Referring now Table-8, and to FIGS. 9 and 10, the incremental AT&T payoff and incremental TA settlement fee paid by AT&T vs Country B's ASR improvement is shown. Although it can be seen that improving Country B's ASR does not result in as prominent an AT&T incremental payoff or new TA settlement fee as much as improvement's to Country A's ASR produce, the curves still show that the greater the ASR improvement, the greater the payoff AT&T gains and the higher the improvements to settlement fee TA receives from AT&T.

TABLE 8

The Incremental AT & T Payoff and Incremental TA Settlement Fee paid by AT & T vs Country B's ASR improvement.

| Δ ASR | ADD MIN | | | ADD REV | ADD SETTLEMENT FEE | | | ADD ACCESS FEE | | |
|---|---|---|---|---|---|---|---|---|---|---|
| | out | in | total | total | out | in | total | out | in | total |
| 0.01 | 115K | 1K | 116K | 129K | −94K | 1K | −93K | 18K | −0K | 18K |
| 0.02 | 226K | 3K | 229K | 254K | −185K | 2K | −183K | 35K | −0K | 35K |
| 0.03 | 334K | 4K | 339K | 375K | −274K | 3K | −270K | 53K | −0K | 53K |
| 0.04 | 440K | 6K | 445K | 493K | −359K | 4K | −355K | 70K | −0K | 70K |
| 0.05 | 542K | 7K | 549K | 607K | −443K | 5K | −438K | 87K | −0K | 87K |
| 0.06 | 641K | 8K | 649K | 718K | −524K | 6K | −518K | 104K | −1K | 103K |
| 0.07 | 738K | 10K | 747K | 827K | −603K | 7K | −596K | 121K | −1K | 120K |
| 0.08 | 832K | 11K | 843K | 932K | −680K | 8K | −672K | 137K | −1K | 137K |
| 0.09 | 923K | 12K | 936K | 1035K | −755K | 9K | −746K | 154K | −1K | 153K |
| 0.10 | 1012K | 13K | 1026K | 1134K | −828K | 10K | −818K | 170K | −1K | 169K |
| 0.11 | 1099K | 15K | 1114K | 1232K | −899K | 11K | −888K | 186K | −1K | 185K |
| 0.12 | 1184K | 16K | 1200K | 1327K | −968K | 12K | −956K | 202K | −1K | 201K |
| 0.13 | 1266K | 17K | 1283K | 1419K | −1035K | 12K | −1023K | 217K | −1K | 216K |
| 0.14 | 1347K | 18K | 1365K | 1509K | −1101K | 13K | −1088K | 233K | −1K | 232K |
| 0.15 | 1425K | 19K | 1425K | 1597K | −1165K | 14K | −1151K | 248K | −1K | 247K |

| Δ ASR | ADD BILLING EXP. total | ADD NTWK EXP. | | total | ADD OP-WK EXP. total | SAVING (w/o PR) (w/o FD) total | UNCOLLECTIVE LOSS total | SAVING total |
|---|---|---|---|---|---|---|---|---|
| | | out | in | | | | | |
| 0.01 | −2K | 8K | −0K | 8K | −0K | 59K | −5K | 125K |
| 0.02 | −5K | 15K | −0K | 15K | −1K | 116K | −9K | 247K |
| 0.03 | −7K | 23K | −0K | 23K | −1K | 172K | −13K | 365K |
| 0.04 | −9K | 30K | −0K | 30K | −1K | 227K | −18K | 481K |
| 0.05 | −11K | 37K | −0K | 37K | −1K | 281K | −22K | 594K |
| 0.06 | −13K | 45K | −0K | 44K | −2K | 333K | −26K | 704K |
| 0.07 | −15K | 52K | −0K | 52K | −2K | 385K | −29K | 811K |
| 0.08 | −17K | 59K | −0K | 59K | −2K | 435K | −33K | 916K |
| 0.09 | −18K | 66K | −0K | 66K | −2K | 485K | −37K | 1019K |
| 0.10 | −21K | 73K | −0K | 73K | −3K | 534K | −40K | 1119K |
| 0.11 | −23K | 80K | −0K | 79K | −3K | 582K | −44K | 1217K |
| 0.12 | −25K | 86K | −0K | 86K | −3K | 629K | −47K | 1313K |
| 0.13 | −27K | 93K | −0K | 93K | −3K | 675K | −50K | 1407K |
| 0.14 | −28K | 100K | −0K | 99K | −4K | 720K | −54K | 1499K |
| 0.15 | −30K | 106K | −0K | 106K | −4K | 765K | −57K | 1588K |

Table-9 shows the incremental AT&T MOI and incremental TA settlement fee paid by AT&T vs AT&T-Country B's international circuit additions. The output shows that given the current conditions, present and of circuits between AT&T and Country B's ISC is sufficient. By adding more circuits the more revenue both AT&T and Country B lose.

TABLE 9

The Incremental AT & T MOI and Incremental TA Settlement
Fee Paid by AT & T vs AT & T-Country B's International
Circuit Additions.

| Δ | ADD MIN | | | ADD REV | ADD SETTLEMENT FEE | | | ADD ACCESS FEE | | | ADD BILLING EXP. |
|---|---|---|---|---|---|---|---|---|---|---|---|
| TRK | out | in | total | total | out | in | total | out | in | total | total |
| 1 | 1K | 1K | 1K | 1K | –0K | 0K | –0K | 0K | –0K | –0K | –0K |

| Δ | ADD NTWK EXP. | | | ADD OP-WK EXP. | SAVING (w/o PR) (w/o FD) | UNCOLLECTIVE LOSS | SAVING | MOI |
|---|---|---|---|---|---|---|---|---|
| TRK | out | in | total | total | total | total | total | total |
| 1 | 0K | –0K | –0K | –0K | 1K | –0K | 1K | –3K |

As will be apparent to those skilled in the art, major applications of the ECON method will include:

Network Facility Planning—The ECON method can be used as a guide in determining which countries are the best candidates for adding gateway circuits.

In-country Service Improvement—The method can be used as a guide in determining which countries are the best candidates for ASR improvement activities by region.

Global Network Initiatives—to evaluate particular proposed changes for a particular country or region.

Network Systems—Relative to selling equipment and systems to improve network infrastructures, the method can help determine additional revenues to the telecommunications administrator.

In-country Service revenues—Although the tool is oriented towards to US to country x and back, still, assuming that data is available, the method can be also used to estimate new revenues based on adding internal capacity to any country's network.

Accounting Rate Negotiation—The method can be used as a guide in determining which countries are the best candidates for negotiating lower accounting rates.

Quality Control—Used regularly and tracked, the outputs of this model can be employed to identify outliers in terms of controlling the processes of the interexchange carrier, e.g., if profitability suddenly jumps between two periods for a particular country.

Other uses of the model can be envisioned.

For simplicity, the ECON method and model assumes that all the international circuits are two way, which as those skilled in the art will know is true for most countries. Another assumption needed for the engineering model involves the number of trunk groups. Under current trunk architecture as applied in the art, it is reasonable to assume a big trunk pipe exists between domestic interexchange carriers and foreign country ISCs. As a practical matter, the model will assist to predict a level of circuit additions needed, not where to add those circuits, in an effort to optimize profitability and performance.

The average holding time for an international completed call is derived from known databases, such as the IMCDB database of AT&T. A call that did not complete (unbillable, i.e., blocked, busy, ring no answer calls) is assumed to have been held up in the network for 25 seconds on average. This average holding time includes call set-up, busy, ring, no answer holding time.

In addition, in developing and testing the method and its outputs, the year-to-date average ASR for the complete whole year has been used. For most countries, the ASR is improving steadily, and the predicted results of the method are within ranges which will be acceptable to those skilled in the art for purposes of network engineering planning. However, for the countries undergoing strong ASR improvement, the model's prediction might require a degree of correction (particularly in determining a proper level of ASR to apply).

Finally, due to the uncertainty of the exact origin of the calls placed within the U.S., the method assumes that the traffic leaving the U.S. from a particular ISC has originated in the area of that ISC, so as to apply a tariff structure based on a single time zone (CST). Taken for estimates produced by the method over an extended time period, the results of the method will account for in this assumption.

Thus, the invention develops an economic method and model for evaluating the worth of adding circuits to an international link between a US/ISC and a foreign country ISC. The method also provides a way to measure the performance and profitability of improving foreign internal network call completion rates (ASR). Furthermore, the ECON method serves as an economic study tool for international network planning and engineering. It can provide users with a means to forecast profitability through "what-if" studies.

The ECON tool will also help international carrier network planners and DMOQ teams on:

Prioritizing Overseas ASR Improvement Activities

Implementing Economic GOS

Providing network planners with a list (in order of savings) of countries where various numbers of circuits can be profitably added.

Providing useful insights into the network planning process.

It will be apparent that many modifications of the method and model and the bases for the choices therein can be made within the spirit and scope of the invention without departing from the spirit and scope of the appended claims, it being understood that this invention is not limited to the specific embodiment shown.

What is claimed is:

1. A method for monitoring telephone call completion data to evaluate the economic impact of (a) adding call handling capacity to an overseas telephone trunk group and/or (b) improving a foreign internal telephone network call Answer Seizure Ratio (ASR), comprising the steps of:

(a) compiling a set of input data information for telephone network call loads and expenses;

(b) evaluating the set of input data information with a telephone call retrial model to determine billable carried telephone call loads and ineffective telephone call attempts handled by said telephone network;

(c) applying a revenue and expense model to said billable carried telephone call loads and ineffective telephone call attempts to determine the revenues and expenses associated with said billable carried telephone call loads and said ineffective telephone call attempts;

(d) wherein said step of applying said revenue and expense model to said billable carried telephone call loads and said ineffective telephone call attempts includes the step of recalculating the revenues and expenses associated with said billable carried telephone call loads and said ineffective call attempts based upon an increased capacity to said overseas telephone trunk group and/or upon an improvement in the ASR of said foreign internal telephone network.

2. The method of claim 1, including the step of applying a proportional return of telephone call load from a foreign internal telephone network to a domestic telephone network based upon an increased number of trunk circuit additions and/or to an improvement in the ASR of said foreign internal telephone network.

3. The method of claim 1, including the step of applying the impact of fraud losses on said telephone networks based upon an increased number of trunk circuit additions and/or to an improvement in the ASR of said foreign internal telephone network.

4. The method of claim 1, wherein said step of evaluating the set of input data information with a telephone call retrial model includes the steps of:

(a) determining the proportion of the telephone call load initially attempted by an originating caller that will be carried by the overseas telephone trunk; and (b) determining the proportion of the telephone call load carried by the overseas telephone trunk that will be billed to the originating caller.

5. The method of claim 4, wherein said step of determining what proportion of the telephone load initially attempted by an originating caller will be carried by the overseas telephone trunk includes the steps of:

(a) determining the proportion of the initial offered telephone load that will be blocked within the domestic telephone network and overseas telephone trunk; and (b) determining the proportion of the initial offered telephone load blocked within the domestic telephone network that will be reattempted by a caller.

6. The method of claim 5, wherein the step of determining what proportion of the initial offered telephone load blocked by the domestic telephone network that will be reattempted by a caller includes the step of determining what proportion of the blocked offered load will be aborted by a caller.

7. The method of claim 4, wherein said step of determining what proportion of the telephone call load carried by the overseas telephone trunk will be billed to the originating caller includes the steps of:

(a) determining what proportion of the telephone call load carried by the overseas telephone trunk will not be successfully transmitted to a destination user, including the steps of:

(i) determining what proportion of the telephone call load carried by the overseas telephone trunk will be blocked within a foreign internal telephone network; and (ii) determining what proportion of the telephone call load carried by the overseas telephone trunk will not be responded to by a destination user within the foreign internal telephone network; and (b) determining what proportion of the telephone call load carried by the overseas telephone trunk that is not successfully transmitted to a destination user or not responded to by a destination user will be reattempted by an originating caller.

8. The method of claim 7, wherein the step of determining the proportion of the telephone call load carried by the overseas telephone trunk that is not successfully transmitted to a destination user or not responded to by a destination user and that will be reattempted by an originating caller includes the step of determining what proportion of the unsuccessfully transmitted load will be aborted by an originating caller.

9. The method of claim 8, further including the step of reapplying the proportion of the telephone call load that is not successfully transmitted to a destination user and that will be reattempted by an originating caller into the proportion of the offered telephone call load that will be introduced into the domestic telephone network.

10. A method for analyzing telephone call completion data to forecast the economic impact of additions to overseas telephone trunk capacity and/or to improvements in foreign internal telephone network Answer Seizure Ratio (ASR), comprising the steps of:

(a) compiling a set of input data information for (i) telephone call loads presented to the network of an interexchange carrier and (ii) expenses associated with said telephone call loads;

(b) evaluating a first attempt offered telephone call load presented to the network of the interexchange carrier with a phone call retrial model to determine the proportion of a total offered load that will be transmitted from the network of the interexchange phone carrier to an international end destination;

(c) wherein the step of determining the proportion of the total offered load that will be transmitted to the international end destination includes the steps of (i) determining the proportion of the total offered load that will be transmitted to overseas telephone trunks; (ii) determining the proportion of the total offered load which is unbillable to the interexchange carrier; and (iii) determining the proportion of the total offered load transmitted to the overseas telephone trunk that will be responded to by an international end destination and billable to the originating caller;

(d) applying the proportions of the total offered load that will be (i) responded to by the international end destination; and (ii) that will be unbillable to the interexchange carrier to a revenue and expense model incorporating said input data information to determine revenues and expenses associated with said responded to or unbillable portions of the total offered load;

(e) applying said phone call retrial model based on additions to telephone trunk capacity and/or improvements to foreign internal telephone network ASR to determine second proportions of total offered telephone call loads presented to the network of an interexchange phone carrier that will be (i) responded to by an international end destination; or (ii) unbillable by an interexchange carrier;

(f) re-applying said revenue and expense model to said second proportions of the total offered load to determine the revenues and expenses associated with said second responded to or unbillable proportions of the total offered load; and (g) calculating the difference between the revenues and expenses obtained for said first and second responded to or unbillable proportions of the total offered load to evaluate the economic impact of additions to overseas telephone trunk capacity and/or improvements to the ASR of a foreign internal telephone network.

11. The method of claim 10, wherein the step of determining the proportion of the total offered load that will be transmitted to the overseas telephone trunk includes the steps of:

(a) determining the proportion of the initial offered telephone call load that will be blocked within the domestic telephone network and the overseas telephone trunk; and (b) determining the proportion of the initial offered telephone load blocked within the domestic telephone network that will be reattempted by a caller.

12. The method of claim 11, wherein the step of determining what proportion of the initial offered load is reattempted by a caller includes the step of determining the proportion of the blocked offered load that will be aborted by a caller.

13. The method of claim 10, wherein the step of determining the proportion of the total offered load transmitted to the overseas telephone trunks that will be responded to by an international end destination and billable to the originating caller includes the steps of:

(a) determining what proportion of the offered telephone call load carried by the overseas telephone trunk will not be successfully transmitted to a destination user, including the steps of:
  (i) determining what proportion of the telephone call load carried by the overseas telephone trunk will be blocked within the foreign internal telephone network; and
  (ii) determining what proportion of the telephone call load carried by the overseas telephone trunk will not be acknowledged by a destination user within the foreign internal telephone network; and (b) determining what proportion of the offered telephone call load carried by the overseas telephone trunk that is not successfully responded to by a destination user will be reattempted by an originating caller.

14. The method of claim 13, wherein the step of determining what proportion of the offered telephone call load carried by the overseas telephone trunk that is not successfully responded to by a destination user and that will be reattempted by an originating caller includes the step of determining what proportion of the unsuccessfully transmitted load will be aborted by an originating caller.

15. The method of claim 13, further including the step of reapplying the proportion of the offered telephone call load that is not successfully responded to by a destination user and that will be reattempted by an originating caller into the proportion of the first attempt offered telephone call load that will be introduced into the domestic telephone network.

16. A method for monitoring telephone call completion data to forecast the economic impact of additions to overseas trunk telephone capacity and/or to improvements in foreign internal telephone network Answer Seizure Ratio (ASR), comprising the steps of:

(a) compiling a set of input data information for telephone network call loads and expenses;

(b) evaluating the set of input data information with a two-link telephone call retrial model having a domestic link phone call retrial portion and an international link phone call retrial portion to determine a volume of billable telephone call loads and a quantity of ineffective telephone call attempts handled by said telephone network;

(c) wherein the step of evaluating the set of input data information with the two-link telephone call retrial model includes the steps of:
  (i) reapplying a first attempt offered telephone call load that has been previously calculated by a domestic telephone call retrial model back to said domestic phone call retrial model to reengineer values of load blocking and carried telephone call loads for said telephone network;
  (ii) applying the reengineered values for blocking and carried telephone phone call loads to said two-link telephone call retrial model to calculate a value of first attempt offered telephone call load;
  (iii) comparing the value of said calculated first attempt offered telephone call load against a value of first attempt offered telephone call load calculated by a constraint equation;
  (iv) substituting into step (i) said calculated value of first attempt offered telephone call load for the first attempt offered load previously calculated by said domestic phone call retrial model; and
  (v) repeating steps (i)–(iv) until said first attempt offered load calculated by said two-link telephone call retrial model equals the value of the first attempt offered load provided by said constraint equation.

17. The method of claim 16, further comprising the steps of:

(a) applying a revenue and expense model to said volume of billable telephone call loads and said quantity of ineffective call attempts to determine the revenues and expenses associated with said billable telephone call loads and said quantity of ineffective call attempts; and (b) wherein said step of applying said revenue and expense model to said volume of billable telephone call loads and said quantity of ineffective call attempts includes the step of recalculating the revenues and expenses associated with said volume of billable telephone call loads and ineffective call attempts based upon an increased capacity to said overseas telephone trunk and/or upon an improvement to a foreign internal telephone network ASR.

18. The method of claim 17, including the step of applying a proportional return of telephone call load from a foreign telephone network to a domestic telephone network based upon an increased number of trunk circuit additions and/or to an improvement in the ASR of a foreign internal telephone network.

19. The method of claim 17, including the step of applying the impact of fraud losses on the telephone networks based upon an increased number of trunk circuit additions and/or to an improvement in the ASR of a foreign internal telephone network.

20. A method for monitoring telephone call completion data to evaluate the economic impact of (a) adding call handling capacity to an overseas telephone trunk group and/or (b) improving a foreign internal telephone network call Answer Seizure Ratio (ASR), comprising the steps of:

(a) compiling a set of input data information for telephone network call loads and expenses;

(b) evaluating the set of input data information with a telephone call retrial model to determine billable carried telephone call loads and ineffective telephone call attempts handled by said telephone network;

(c) evaluating said billable carried telephone loads and ineffective call attempts with a call load profile model for evaluating incoming and outgoing calling activity from said telephone network to forecast telephone network calling requirements for a user-defined period;

(d) applying a revenue and expense model to said evaluated incoming and outgoing calling activity to determine the revenues and expenses associated with said calling activity;

(e) wherein said step of applying said revenue and expense model to said evaluated incoming and outgoing calling activity includes the step of recalculating the revenues and expenses associated with said incoming and outgoing calling activity based upon an increased capacity to said overseas telephone trunk group and/or upon an improvement in the ASR of said foreign internal telephone network.

21. The method according to claim 20, wherein said step of evaluating said billable carried telephone loads and ineffective call attempts with said call load profile model includes the step of calculating the first attempt offered calling load for a given calling hour for a given calling month.

22. The method according to claim 21, wherein the step of calculating the first attempt offered calling load for a given calling hour for a given calling month includes the step:

(a) calculating the fraction of calling load percentage for a given calling hour of a given calling month relative to the calling load percentage of a peak calling hour of a peak calling month; and (b) correlating the fraction against a reported actual peak calling hour of a peak calling month.

23. The method according to claim 21, including the steps of:

(a) evaluating the fraction ratio of an average weekend day calling load relative to an average business day calling load;

(b) calculating the total offered calling load for each calling hour of each business and weekend day; and (c) evaluating an annual total offered calling load requirement by summing the calculating total offered calling loads for each calling hour of each business and weekend day and multiplying that sum by a figure representative of an average number of days for a given calling month.

24. The method of claim 1, wherein said step of recalculating the revenues and expenses associated with said carried calling load includes the step of evaluating a capital equipment cost model representative of costs associated with said increased trunk group capacity and/or improvement in foreign internal telephone network ASR.

25. The method of claim 20, wherein said step of applying said revenue and expense model to said evaluated calling activity incoming and outgoing from said telephone network further includes the step of evaluating a capital equipment cost model representative of costs associated with said increased trunk group capacity and/or improvement in foreign internal telephone network ASR.

26. Means for monitoring telephone call completion data to evaluate the economic impact of (a) adding call handling capacity to an overseas telephone trunk group and/or (b) improving a foreign internal telephone network call Answer Seizure Ratio (ASR), comprising:

(a) means for compiling a set of input data information for telephone network call loads and expenses;

(b) means for evaluating the set of input data information with a telephone call retrial model to determine billable carried telephone call loads and ineffective telephone call attempts handled by said telephone network;

(c) said means for monitoring including means for applying a revenue and expense model to said billable carried telephone call loads and ineffective telephone call attempts to determine the revenues and expenses associated with said billable carried telephone call loads and said ineffective telephone call attempts;

(d) wherein said means for applying said revenue and expense model to said billable carried telephone call loads and said ineffective telephone call attempts includes means for recalculating the revenues and expenses associated with said billable carried telephone call loads and said ineffective call attempts based upon an increased capacity to said overseas telephone trunk group and/or upon an improvement in the ASR of said foreign internal telephone network.

27. The means according to claim 26, including means for applying a proportional return of telephone call load from a foreign internal telephone network to a domestic telephone network based upon an increased number of trunk circuit additions and/or to an improvement in the ASR of said foreign internal telephone network.

28. The means according to claim 27, including means for applying the impact of fraud losses on said telephone networks based upon an increased number of trunk circuit additions and/or to an improvement in the ASR of said foreign internal telephone network.

29. The means according to claim 28, wherein said means for evaluating the set of input data information with a telephone call retrial model includes:

(a) means for determining the proportion of the telephone call load initially attempted by an originating caller that will be carried by the overseas telephone trunk; and (b) means for determining the proportion of the telephone call load carried by the overseas telephone trunk that will be billed to the originating caller.

30. Means for analyzing telephone call completion data to forecast the economic impact of additions to overseas telephone trunk capacity and/or to improvements in foreign internal telephone network Answer Seizure Ratio (ASR), comprising:

(a) means for compiling a set of input data information for (i) telephone call loads presented to the network of an interexchange carrier and (ii) expenses associated with said telephone call loads;

(b) means for evaluating a first attempt offered telephone call load presented to the network of the interexchange carrier with a phone call retrial model to determine the proportion of a total offered load that will be transmitted from the network of the interexchange phone carrier to an international end destination;

(c) wherein the means for determining the proportion of the total offered load that will be transmitted to the international end destination includes means for (i)

determining the proportion of the total offered load that will be transmitted to overseas telephone trunks; (ii) determining the proportion of the total offered load which is unbillable to the interexchange carrier; and (iii) determining the proportion of the total offered load transmitted to the overseas telephone trunk that will be responded to by an international end destination and billable to the originating caller;

(d) said means for analyzing including means for applying the proportions of the total offered load that will be (i) responded to by the international end destination and (ii) that will be unbillable to the interexchange carrier to a revenue and expense model incorporating said input data information to determine revenues and expenses associated with said responded to or unbillable portions of the total offered load;

(e) said means for analyzing further including means for applying said phone call retrial model based on additions to telephone trunk capacity and/or improvements to foreign internal telephone network ASR to determine second proportions of total offered telephone call loads presented to the network of an interexchange phone carrier that will be (i) responded to by an international end destination or (ii) unbillable by an interexchange carrier;

(f) means for re-applying said revenue and expense model to said second proportions of the total offered load to determine the revenues and expenses associated with said second responded to or unbillable proportions of the total offered load; and (g) means for calculating the difference between the revenues and expenses obtained for said first and second responded to or unbillable proportions of the total offered load to evaluate the economic impact of additions to overseas telephone trunk capacity and/or improvements to the ASR of a foreign internal telephone network.

31. Means for monitoring telephone call completion data to forecast the economic impact of additions to overseas trunk telephone capacity and/or to improvements in foreign internal telephone network Answer Seizure Ratio (ASR), comprising:

(a) means for compiling a set of input data information for telephone network call loads and expenses;

(b) means for evaluating the set of input data information with a two-link telephone call retrial model having a domestic link phone call retrial portion and an international link phone call retrial portion to determine a volume of billable telephone call loads and a quantity of ineffective telephone call attempts handled by said telephone network;

(c) wherein the means for evaluating the set of input data information with the two-link telephone call retrial model includes means for carrying out the following steps:

(i) reapplying a first attempt offered telephone call load that has been previously calculated by a domestic telephone call retrial model back to said domestic phone call retrial model to reengineer values of load blocking and carried telephone call loads for said telephone network;

(ii) applying the reengineered values for carried telephone phone call loads to said two-link telephone call retrial model to calculate value of blocking rates and first attempt offered telephone call load;

(iii) comparing the value of said calculated first attempt offered telephone call load against a value of first attempt offered telephone call load calculated by a constraint equation;

(iv) substituting into step (i) said calculated value of first attempt offered telephone call load for the first attempt offered load previously calculated by said domestic phone call retrial model; and (v) repeating steps (i)–(iv) until said first attempt offered load calculated by said two-link telephone call retrial model equals the value of the first attempt offered load provided by said constraint equation.

32. Means for monitoring telephone call completion data to evaluate the economic impact of (a) adding call handling capacity to an overseas telephone trunk group and/or (b) improving a foreign internal telephone network call Answer Seizure Ratio (ASR), comprising:

(a) means for compiling a set of input data information for telephone network call loads and expenses;

(b) means for evaluating the set of input data information with a telephone call retrial model to determine billable carried telephone call loads and ineffective telephone call attempts handled by said telephone network;

(c) means for evaluating said billable carried telephone loads and ineffective call attempts with a call load profile model for evaluating incoming and outgoing calling activity from said telephone network to forecast telephone network calling requirements for a user-defined period;

(d) means for applying a revenue and expense model to said evaluated incoming and outgoing calling activity to determine the revenues and expenses associated with said calling activity;

(e) wherein said means for applying said revenue and expense model to said evaluated incoming and outgoing calling activity includes means for recalculating the revenues and expenses associated with said incoming and outgoing calling activity based upon an increased capacity to said overseas telephone trunk group and/or upon an improvement in the ASR of said foreign internal telephone network.

* * * * *